US009946767B2

(12) United States Patent
Chidlovskii

(10) Patent No.: US 9,946,767 B2
(45) Date of Patent: Apr. 17, 2018

(54) SMOOTHED DYNAMIC MODELING OF USER TRAVELING PREFERENCES IN A PUBLIC TRANSPORTATION SYSTEM

(71) Applicant: Conduent Business Services, LLC, Dallas, TX (US)

(72) Inventor: Boris Chidlovskii, Meylan (FR)

(73) Assignee: Conduent Business Services, LLC, Dallas, TX (US)

( * ) Notice: Subject to any disclaimer, the term of this patent is extended or adjusted under 35 U.S.C. 154(b) by 278 days.

(21) Appl. No.: 15/000,560

(22) Filed: Jan. 19, 2016

(65) Prior Publication Data

US 2017/0206201 A1    Jul. 20, 2017

(51) Int. Cl.
*G06F 17/30*     (2006.01)
*G06F 17/16*     (2006.01)
*G06Q 50/30*     (2012.01)
*G06Q 10/02*     (2012.01)
*G06Q 10/04*     (2012.01)

(52) U.S. Cl.
CPC .......... *G06F 17/3053* (2013.01); *G06F 17/16* (2013.01); *G06F 17/30867* (2013.01); *G06Q 10/025* (2013.01); *G06Q 10/047* (2013.01); *G06Q 50/30* (2013.01)

(58) Field of Classification Search
CPC ........... G06F 17/3053; G06F 17/30867; G06F 17/16; G06Q 10/025; G06Q 10/047; G06Q 50/30
USPC ......................................... 707/723
See application file for complete search history.

(56) References Cited

U.S. PATENT DOCUMENTS

| | | | |
|---|---|---|---|
| 6,622,084 B2* | 9/2003 | Cardno ................. | G06Q 10/02 701/425 |
| 9,116,007 B2* | 8/2015 | Griffiths ............. | G01C 21/3423 |
| 9,726,502 B2* | 8/2017 | Ni .......................... | G01C 21/20 |
| 2003/0109266 A1* | 6/2003 | Rafiah ................ | G01C 21/3423 455/456.1 |
| 2010/0280748 A1* | 11/2010 | Mundinger .......... | G06Q 10/047 701/532 |
| 2010/0305984 A1* | 12/2010 | Ben-Yitschak ........ | G06Q 10/02 705/6 |

(Continued)

OTHER PUBLICATIONS

Chidlovskii, Boris, "Learning Urban Users' Choices to Improve Trip Recommendations", DSAA 2015, Paris, France, Oct. 19-21, 2015, IEEE, pp. 1-9.*

(Continued)

*Primary Examiner* — Robert Stevens
(74) *Attorney, Agent, or Firm* — Fay Sharpe LLP

(57) ABSTRACT

A method and system are disclosed for generating a list of trips on an associated transportation network, the list ranked in accordance with time-dependent modeling of passenger preferences. User preferences of choosing a specific public transportation service or change point are modeled by a set of latent variables. Any actual trip on the network is converted into a set of pairwise preferences implicitly made by the passenger during the trip. Sequences of services matrices and change points matrices from the retrieved set of trips and non-negative factorization of the services and change points matrices is performed to smooth the matrices. The set of pairwise preferences are used to learn a ranking function and the output of a journey planner is re-ranked using the ranking function.

23 Claims, 14 Drawing Sheets

(56) References Cited

U.S. PATENT DOCUMENTS

| | | | | |
|---|---|---|---|---|
| 2013/0036139 | A1* | 2/2013 | Kung | G06Q 10/025 707/780 |
| 2013/0060468 | A1* | 3/2013 | Delling | G06Q 10/047 701/527 |
| 2013/0317742 | A1* | 11/2013 | Ulloa Paredes | G06Q 10/063 701/533 |
| 2013/0317747 | A1* | 11/2013 | Chidlovskii | G06N 5/02 701/540 |
| 2013/0317884 | A1* | 11/2013 | Chidlovskii | G06Q 10/063 705/7.31 |
| 2014/0089036 | A1* | 3/2014 | Chidlovskii | G06Q 10/06 705/7.27 |
| 2014/0350979 | A1 | 11/2014 | Paetzold et al. | |
| 2015/0006071 | A1* | 1/2015 | Cai | G01C 21/3492 701/400 |

OTHER PUBLICATIONS

Mokhtari, Amine, et al., "Integrating Complex User Preferences into a Route Planner: A Fuzzy-Set-Based Approach", IFSA-EUSFLAT 2009, Lisbon, Portugal, Jul. 20-24, 2009, pp. 501-506.*

Hsu, Tzu-Kuang, et al., "The preference analysis for tourist choice of destination: A case study of Taiwan", Tourism Management, vol. 30, Issue 2, Apr. 2009, pp. 288-297.*

Dhami, Ishwar, et al., "Identifying and mapping forest-based ecotourism areas in West Virginia—Incorporating visitors' preferences", Tourism Management, vol. 42, Jun. 2014, pp. 165-176.*

Burges, Chris and Shaked, Tal and Renshaw, Erin and Lazier, Ari and Deeds, Matt and Hamilton, Nicole and Hullender, Greg. Learning to Rank Using Gradient Descent. ICML'05, pp. 89-96, 2005.

Christopher J. C. Burges and Robert Ragno and Quoc Viet Le. Learning to Rank with Nonsmooth Cost Functions. Proc. NIPS'06, pp. 193-200, 2006.

Elsas, Jonathan L. and Dumais, Susan T. Leveraging Temporal Dynamics of Document Content in Relevance Ranking. Proc. WSDM '10, pp. 1-10, New York, NY, USA, 2010. ACM.

Yoav Freund and Raj D. Iyer and Robert E. Schapire and Yoram Singer. An efficient boosting algorithm for combining preferences. J. Machine Learning Res., 4:933-969, 2003.

Jerome H. Friedman. Greedy Function Approximation: A Gradient Boosting Machine. Annals of Statistics, 2000, 45 pages.

Gillis, Nicolas and Glineur, François. Accelerated Multiplicative Updates and Hierarchical Als Algorithms for Nonnegative Matrix Factorization. Neural Comput., 2012, 17 pages.

Herbrich, R. and Graepel, T. and Obermayer, K. Large Margin Rank Boundaries for Ordinal Regression. Advances in Large Margin Classifiers, pp. 115-132, 2000.

Hoyer, Patrik O. Non-negative Matrix Factorization with Sparseness Constraints. J. Mach. Learn. Res., 5:1457-1469, 2004.

Kim, Hyunsoo and Park, Haesun. Nonnegative Matrix Factorization Based on Alternating Nonnegativity Constrained Least Squares and Active Set Method. SIAM J. Matrix Anal. Appl., 30(2):713-730, 2008.

Lee, Daniel D and Seung, H Sebastian. Algorithms for non-negative matrix factorization. Proc. NIPS'01, pp. 556-562, 2001.

Mankad, Shawn and Michailidis, George. Structural and functional discovery in dynamic networks with non-negative matrix factorization. Phys. Rev. E, 88:042812, 2013, 16 pages.

Ankan Saha and Vikas Sindhwani. Learning evolving and emerging topics in social media: a dynamic NMF approach with temporal regularization. Proc. WSDM'12, pp. 693-702, 2012.

Sun, J.Z. and Parthasarathy, D. and Varshney, K.R. Collaborative Kalman Filtering for Dynamic Matrix Factorization. IEEE Trans. on Signal Processing, 62(14):3499-3509, 2014.

Ming-Feng Tsai and Tie-Yan Liu and Tao Qin and Hsin-Hsi Chen and Wei-Ying Ma. Frank: a ranking method with fidelity loss. Proc. SIGIR'07, pp. 383-390, 2007.

Zheng, Zhaohui and Chen, Keke and Sun, Gordon and Zha, Hongyuan. A Regression Framework for Learning Ranking Functions Using Relative Relevance Judgments. Proc. SIGIR '07, pp. 287-294, New York, NY, USA, 2007. ACM.

* cited by examiner

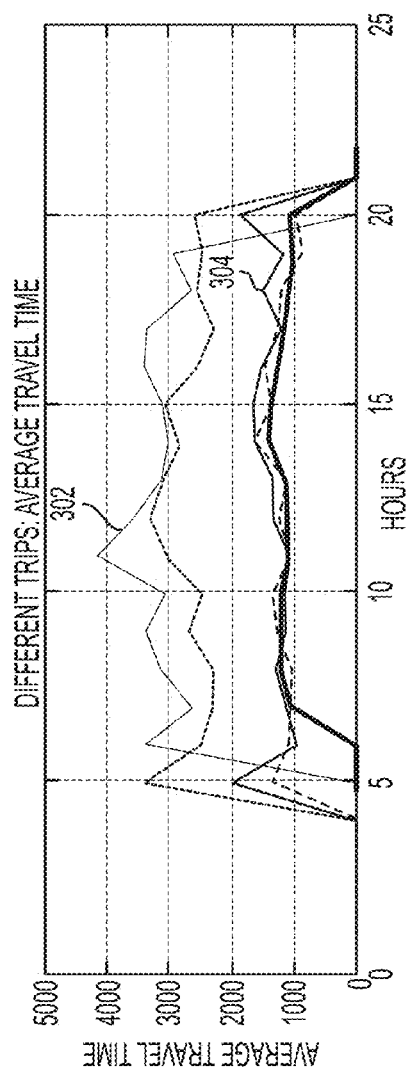
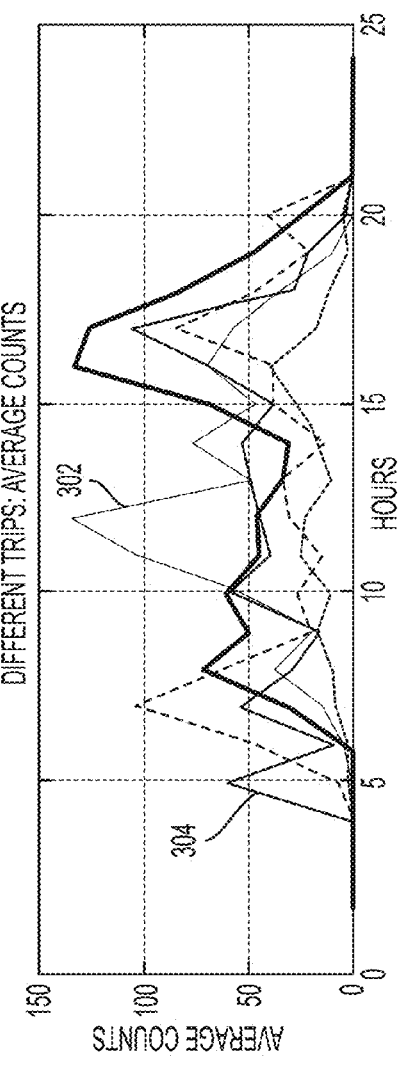
FIG. 3A
FIG. 3B

| CHARACTERISTICS | MIN | MAX | AVERAGE |
|---|---|---|---|
| DAILY PASSENGER COUNTS | 100.1 | 1863.4 | 418.3 |
| N OF DIFFERENT TRIPS | 4 | 21 | 6.71 |
| AVG TRANSFER TIME (MIN) | 13.1 | 39.1 | 27.2 |
| N OF CHANGES | 1 | 3 | 2.34 |
| UNCERTAINTY (KL) RATIO | 0.98 | 4.61 | 2.39 |

FIG. 10

| METHOD | T=24 | T=48 |
|---|---|---|
| BASELINE: TRIP PLANNER | 24.91 ± 1.20 | 24.73 ± 1.28 |
| COLLAPSED: SERVICES | 24.73 ± 1.17 | 24.73 ± 1.22 |
| COLLAPSED: CHANGES | 19.69 ± 1.01 | 19.69 ± 1.09 |
| COLLAPSED: SRVCS+ CHNGS | 19.30 ± 1.14 | 19.30 ± 1.03 |
| COLLAPSED: SUM | 19.59 ± 1.13 | 19.59 ± 1.10 |
| INDEP: SERVICES | 14.08 ± 0.92 | 10.42 ± 0.97 |
| INDEP: CHANGES | 9.55 ± 0.90 | 9.59 ± 0.86 |
| INDEP: SRVCS+ CHNGS | 9.52 ± 0.89 | 9.41 ± 0.87 |
| INDEP: SUM | 10.42 ± 0.89 | 9.37 ± 0.86 |
| SMOOTH: SERVICES | 9.55 ± 0.77 | 9.55 ± 0.78 |
| SMOOTH: CHANGES | 6.71 ± 0.81 | 6.69 ± 0.74 |
| SMOOTH: SRVCS+ CHNGS | 5.83 ± 0.81 | 6.12 ± 0.79 |
| SMOOTH: SUM | 7.63 ± 0.79 | 7.05 ± 0.81 |

FIG. 11

SMOOTHED DYNAMIC MODELING OF USER TRAVELING PREFERENCES IN A PUBLIC TRANSPORTATION SYSTEM

BACKGROUND

The subject disclosure is directed to the transportation arts, trip planning arts, the data processing arts, the data analysis arts, the tracking arts, the predictive arts, and the like.

Many cities and agglomerations have produced a variety of journey planners in the form of a web or mobile application. Upon a user travel request, these planners are configured to generate journeys, i.e., trips on a transportation system via public or private transportation means, using a static library of roads and public transportation network and services attributes and data.

A public transport trip planner, or journey planner, may be designed to provide information about available public transport journeys or routes along the public transportation system, for example via a Web-based application. Such an application may prompt a prospective traveler to input an origin and a destination, and then use a trip planning engine to determine a route between the two input locations using specified available public transportation services and routes, e.g., buses, trams, trains, etc., depending on available schedules for these services. Accordingly, transportation authorities may include such a public transport journey planner on their websites.

A trip planner may find one or more suggested paths between an origin and a destination. The origin and destination may be specified as geospatial coordinates or names of points of access to public transport such as bus stops, stations, airports or ferry ports. A location finding process may resolve the origin and destination into the nearest known nodes on the transport network in order to compute a trip plan over its data set of known paths, i.e., routes. Trip planners for large networks may use a search algorithm to search a graph of nodes (representing access points to the transport network) and edges (representing possible journeys between points). Different weightings such as distance, cost or accessibility may be associated with each edge. When suggesting the journey or trip plans, the trip planner uses the abstract model of the public transportation network and those plans may not reflect the trips that travelers make every day on these routes.

That is, the aforementioned journey planners typically ignore both the time at which a route is to be traveled and, more generally, the preferences of the passengers being served. Instead, preference is given to the shortest route or the fastest route, but not the actual routes real-world travelers took between an origin and a destination. Although these planners are increasingly reliable in their knowledge of the underlying transportation network and available services, each planner shares the same static-world assumptions. In particular, each planner makes a general assumption of constancy and universality, i.e., that the optimal trip is independent of the time and day of the actual journey and of the detailed preferences of passengers.

It will be appreciated, however, that constancy and universality are poor assumptions. Most urban travelers can verify that the best trip between work and home at midnight is not necessarily the best choice to make between the same locations at a different time, e.g., 8:00 AM. Similarly, different passengers may choose different ways to travel between the same origin and destination points.

Public transport passengers often choose different ways to travel between origins and destinations at different points of time. While the personal knowledge may play a role in these divergent choices, in many cases passengers simply have different preferences about the trips they take. For example, one passenger may avoid multiple changes, by extending the duration of her journey by a few minutes, while another passenger simply wants to arrive as quickly as possible to the destination.

When a user queries a planner with a query to journey from an origin o to destination d starting at time s, there are often a large number of trips satisfying the query. The planner provides the k-top recommendations according to a set of predefined criteria, such as the minimal transfer time, the minimal number of changes, etc. The operations of the journey planner are similar to the manner in which information retrieval systems operate, i.e., where the goal is to place the most relevant documents among the k-top answers. It will be appreciated, therefore, that it is critical in intelligent journey planning to suggest k-top trips which reflect the real passenger preferences.

In practice, there is a divergence between the planner provided recommendations and the actual routes and/or trips taken by travelers of the transportation network. As indicated above, trips proposed by the trip planner do not necessarily correspond to choices made by real-world travelers who use the transportation network on a regular basis.

Thus, it would be advantageous to provide an effective system and method for collecting traveler information regarding real world use of a transportation network to facilitate recommendations by a trip planner to users thereof.

INCORPORATION BY REFERENCE

The following references, the disclosures of which are incorporated herein by reference, in their entirety, are mentioned.

Burges, Chris and Shaked, Tal and Renshaw, Erin and Lazier, Ari and Deeds, Matt and Hamilton, Nicole and Hullender, Greg. Learning to Rank Using Gradient Descent. ICML'05, pages 89-96, 2005.

Christopher J. C. Burges and Robert Ragno and Quoc Viet Le. Learning to Rank with Nonsmooth Cost Functions. Proc. NIPS'06, pages 193-200, 2006.

Boris Chidlovskii. Trip Reranking for a Journey Planner. U.S. patent application Ser. No. 14/533,310, filed Nov. 5, 2014.

Elsas, Jonathan L. and Dumais, Susan T. Leveraging Temporal Dynamics of Document Content in Relevance Ranking. Proc. WSDM '10, pages 1-10, New York, N.Y., USA, 2010. ACM.

Yoav Freund and Raj D. Iyer and Robert E. Schapire and Yoram Singer. An efficient boosting algorithm for combining preferences. J. Machine Learning Res., 4:933-969, 2003.

Jerome H. Friedman. Greedy Function Approximation: A Gradient Boosting Machine. Annals of Statistics, 29:1189-1232, 2000.

Gillis, Nicolas and Glineur, François. Accelerated Multiplicative Updates and Hierarchical Als Algorithms for Nonnegative Matrix Factorization. Neural Comput., 24(4): 1085-1105, 2012.

Herbrich, R. and Graepel, T. and Obermayer, K. Large Margin Rank Boundaries for Ordinal Regression. Advances in Large Margin Classifiers, pages 115-132, 2000.

Hoyer, Patrik O. Non-negative Matrix Factorization with Sparseness Constraints. J. Mach. Learn. Res., 5:1457-1469, 2004.

Kim, Hyunsoo and Park, Haesun. Nonnegative Matrix Factorization Based on Alternating Nonnegativity Constrained Least Squares and Active Set Method. SIAM J. Matrix Anal. Appl., 30(2):713-730, 2008.

Lee, Daniel D and Seung, H Sebastian. Algorithms for non-negative matrix factorization. Proc. NIPS'01, pages 556-562, 2001.

Mankad, Shawn and Michailidis, George. Structural and functional discovery in dynamic networks with non-negative matrix factorization. Phys. Rev. E, 88:042812, 2013.

Ankan Saha and Vikas Sindhwani. Learning evolving and emerging topics in social media: a dynamic NMF approach with temporal regularization. Proc. WSDM'12, pages 693-702, 2012.

Sun, J. Z. and Parthasarathy, D. and Varshney, K. R. Collaborative Kalman Filtering for Dynamic Matrix Factorization. IEEE Trans. on Signal Processing, 62(14):3499-3509, 2014.

Ming-Feng Tsai and Tie-Yan Liu and Tao Qin and Hsin-Hsi Chen and Wei-Ying Ma. FRank: a ranking method with fidelity loss. Proc. SIGIR'07, pages 383-390, 2007.

Zheng, Zhaohui and Chen, Keke and Sun, Gordon and Zha, Hongyuan. A Regression Framework for Learning Ranking Functions Using Relative Relevance Judgments. Proc. SIGIR '07, pages 287-294, New York, N.Y., USA, 2007. ACM.

BRIEF DESCRIPTION

In one aspect of the exemplary embodiment, a computer-implemented method for generating a list of trips on an associated transportation network, the list ranked in accordance with time-dependent modeling of passenger preferences, includes receiving a trip request from an associated user, the trip request including an origin, a destination and a departure time on the associated transportation network, and retrieving, from an associated database, a set of actual trips corresponding to the received trip request, the set of actual trips each having a common origin, destination and departure time corresponding to the received trip request. The computer-implemented method further includes acquiring sets of dynamic latent variables including at least one set expressing passenger preferences as to services on the associated transportation network and at least one set expressing passenger preferences as to changes points on the associated transportation network for the retrieved set of actual trips, and converting each retrieved actual trip into a set of pair-wise preferences representing implicit selections of the corresponding passenger on each actual trip. Additionally, the method includes extracting sequences of services matrices and change points matrices from the retrieved set of trips, generating a ranking function in accordance with the extracted sequences and sets of dynamic latent variables associated with the trip request, and applying the ranking function to each trip in the set of retrieved trips corresponding to the received trip request to determine a ranking thereof. Furthermore, the computer-implemented method further includes ranking a list of trips corresponding to the received origin, destination and time received from an associated journey planner.

In another aspect, a system for generating a list of trips on an associated transportation network, the list ranked in accordance with time-dependent modeling of passenger preferences, includes a journey planner including a journey planning engine configured to receive a trip request from an associated user, the trip request including an origin, a destination and a departure time on the associated transportation network and return a list of trips on the associated transportation network responsive thereto, and a re-ranking component configured to rank the list of trips in accordance with a ranking function. The system further includes memory which stores instructions to retrieve, from an associated database, a set of actual trips corresponding to the received trip request, the set of actual trips each having a common origin, destination and departure time corresponding to the received trip request, and to acquire sets of dynamic latent variables including at least one set expressing passenger preferences as to services on the associated transportation network and at least one set expressing passenger preferences as to changes points on the associated transportation network for the retrieved set of actual trips. The memory further stores instructions to convert each retrieved actual trip into a set of pair-wise preferences representing implicit selections of the corresponding passenger on each actual trip, to extract sequences of services matrices and change points matrices from the retrieved set of trips, and to generate a ranking function in accordance with the extracted sequences and sets of dynamic latent variables associated with the trip request. In addition, the memory includes instructions to apply the ranking function to each trip in the set of retrieved trips corresponding to the received trip request to determine a ranking thereof, and rank the list of trips corresponding to the received origin, destination and time received from an associated journey planner. The system further includes a processor operatively communicating with the memory which executes the instructions and implements the journey planner and the re-ranking component.

In another aspect, computer-implemented method for generating a list of trips on an associated transportation network, the list ranked in accordance with time-dependent modeling of passenger preferences. The method includes extracting sequences of services matrices and change points matrices for a set of actual trips retrieved from an associated database responsive to a received trip request, and applying dynamic smoothing non-negative matrix factorization to the extracted sequences of matrices. The computer-implemented method further includes acquiring sets of dynamic latent variables including at least one set expressing passenger preferences as to services on the associated transportation network and at least one set expressing passenger preferences as to changes points on the associated transportation network from the retrieved set of trips, and generating a feature vector for each trip in the retrieved set of actual trips from the extracted sequences of matrices, wherein each feature vector is defined as a function of a trip and a user query to which said trip is responsive. In addition, the computer-implemented method includes converting each retrieved actual trip into a set of pair-wise preferences representing implicit selections of the corresponding passenger on each actual trip, and learning a ranking function in accordance with the feature vectors generated from the smoothed extracted sequences of matrices associated with the trip request.

BRIEF DESCRIPTION OF THE DRAWINGS

FIG. 3A is a graphical representation of travel time for five-top trips in accordance with one aspect of the exemplary embodiment.

FIG. 3B is a graphical representation of average trip counts for the five-top trips depicted in FIG. 3A.

FIG. 10 depicts a table of global statistics on 240 selected trips on the example associated transportation network.

FIG. 11 depicts a table of results of ranking methods for trips compared to a baseline journey planner according to one aspect of the exemplary embodiment of the subject application.

DETAILED DESCRIPTION

Figure 1:
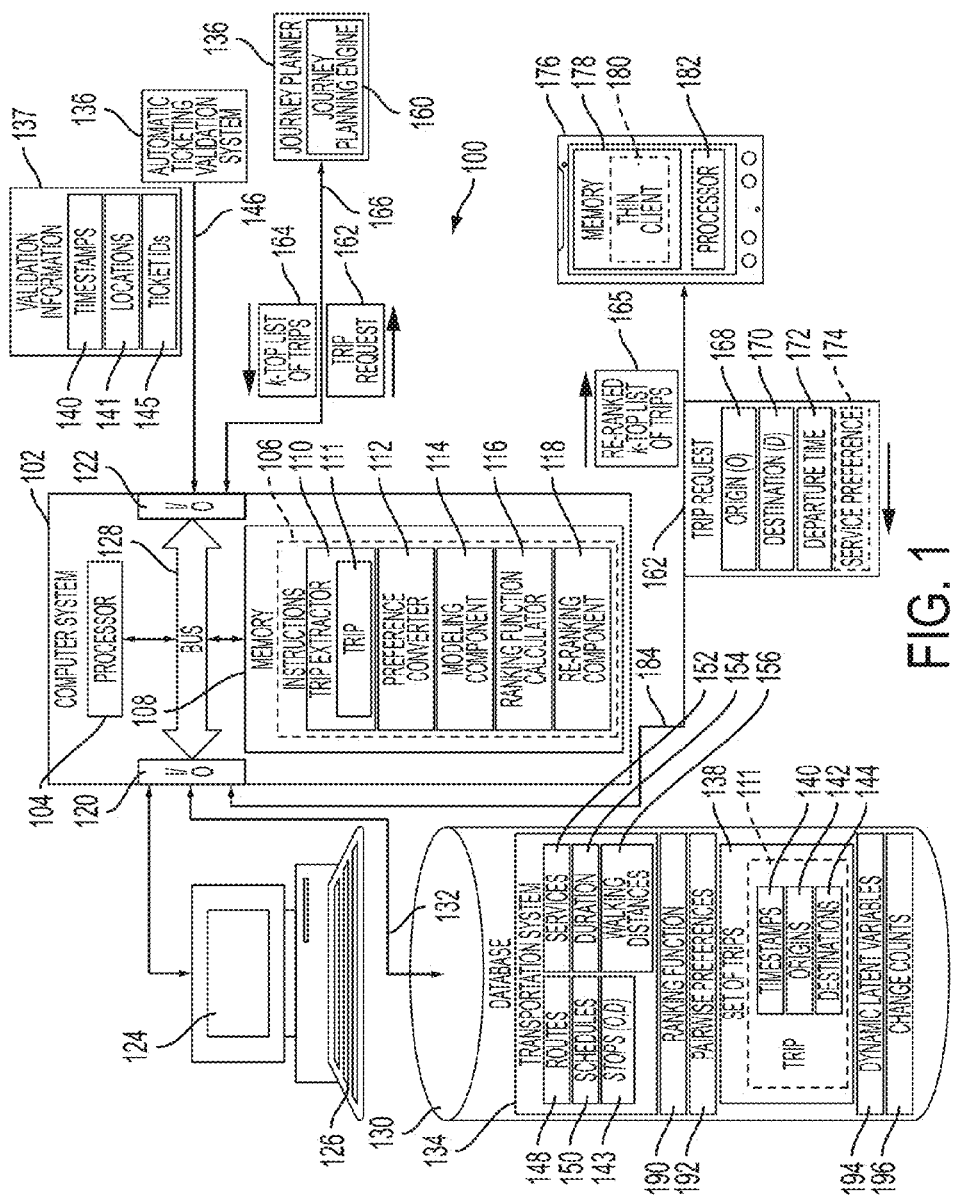
FIG. 1 illustrates a functional block diagram of a system for smoothed dynamic modeling of user traveling preferences on an associated transportation network in accordance with one aspect of the exemplary embodiment.

One or more embodiments will now be described with reference to the attached drawings, wherein like reference numerals are used to refer to like elements throughout. Aspects of exemplary embodiments related to systems and methods for re-ranking trips on an associated transportation network are described herein. In addition, example embodiments are presented hereinafter referring to travel planning on transportation networks, however application of the systems and methods set forth can be made to other areas utilizing "crowd-wisdom" recommendations.

As described herein, there is described a method for providing an updated listing of trip plans on a public transportation network that utilizes "crowd-wisdom" gathered from actual travelers on the network to rank the listed trip plans. In one embodiment, pairs of origins-destinations corresponding to actual trips taken by travelers are gathered. These pairs may be obtained from reporting by the travelers, from automated ticket validation systems, or the like. The validation information may include the time travel was undertaken, the origin (boarding) and destination (alighting) stop or stops along the way, the route taken (transfers, etc.), and other information pertaining to a trip on the transportation network. For any given origin-destination pair, the presence of a validation is an implicit recommendation of the route taken, i.e., a person actually took that route at that time between that origin and that destination. When gathered for a large transportation network, such as a public transportation network of a city, there may be a substantial number of such recommendations for particular routes at particular times.

When a user accesses a trip planner, according to one embodiment, the trip planner may output a list of k-top results, i.e., a list of recommended routes between an origin and a destination selected by the user. A ranking function may be calculated using the received implicit preferences gained from real-world travelers, i.e., experienced users of the transportation system. Thereafter, the ranking function may be applied to the list of results so as to re-rank the results, with the higher ranked trip corresponding to one "implicitly recommended" by the knowledgeable travelers.

It will be appreciated that trip planner recommendations may diverge from real choices made by travelers. That is, trips proposed by the planner should correspond to choices made by real travelers who use the network on the regular basis. However, if the planner proposals diverge from the real choices, then the planner misses some important knowledge when answering user queries for trips. Accordingly, one embodiment disclosed herein utilizes a collection of real trips as a ground truth to validate the planner recommendations, and in the case of divergence, formulates a suitable re-ranking methodology to re-rank the recommendations so as to better reflect the reality.

The embodiments disclosed herein may utilize passenger preferences and time-variant traffic condition estimates in journey planning. Using a large collection of passenger trips, time-variant parameters for choosing a given trip in a transportation network may be learned. An example implementation using real travelers data for a selected transportation network of a city, demonstrates that the trips are measurably closer to those actually chosen by passengers than are the trips produced by planners that use static heuristics. This provides several advantages over current trip planners, particularly in transferring the knowledge of frequent travelers of the transportation network to novice travelers utilizing the trip planner. The accuracy of the trip planner is also increased as the "crowd-wisdom" of experienced travelers is factored into the recommendation of a route from the selected origin to the selected destination as the selected time of day, day of week, etc.

In one embodiment, the trip ranking referenced above is extended with time-dependent modeling of passenger preferences in journey planning. In such an embodiment, user preferences of choosing a specific public transportation service or change point may be modeled by a set of latent variables. Any actual trip may be converted into a set of pair-wise preferences implicitly made by the traveler during the trip. A method for variable estimation by a smoothed dynamic non-negative factorization of service and transit counts is then derived. The set of pairwise preferences is then used to learn a ranking function of trips. This function can be then used to re-rank the k-top recommendations by the planner.

In the embodiment disclosed herein, user traveling preferences are represented as time-dependent latent variables and estimate them from the actual traveler choices. It will be appreciated that the systems and methods set forth herein model the user traveling preferences by two set of dynamic latent variables, where the first group expresses user preferences for public transport services (buses, trams, etc.) while the second group does for the change points (or counts) between the services. It will further be appreciated that the systems and methods disclosed herein reflect that preferences change during the day, by representing all elementary events in the public transportation system as a sequence of service and change counts between the services. Thereafter, any count matrix may be factorized in a non-negative way. Furthermore, the sequences of matrices may be factorized smoothly, in such a way that factors of a given time period remain close to the factors of the previous time period. This naturally reflects the evolution of user preferences during the day. The systems and methods disclosed herein further estimate the temporal latent variables via development of a version of multiplicative updating algorithm for smoothed dynamic non-negative matrix factorization. In accordance with one example application of the systems and methods set forth herein, several ways several ways of using latent variables for describing the actual trips are tested in a dataset collected from the city of Nancy, France; these are used for learning the trip ranking function.

Referring now to FIG. 1, there is shown a system 100 for smoothed dynamic modeling of user traveling preferences in a public transportation system. The system 100 addresses the complementary problem of high-level descriptors for actual trips taken by travelers of an associated transportation system 134, which are used during a ranking function learning. Such ranking function utilizes the implicit preferences of travelers for one route over other routes determined from actual trips taken by travelers of an associated transportation system 134. A set of dynamic latent variables 196, which express user preferences for both public transport services (e.g., buses, trams, subways, etc.) and change counts 198. A dynamic non-negative matrix factorization method is developed for evaluation of the dynamic latent variables 196 from sequences of count matrices. It will be appreciated that the various components depicted in FIG. 1 are for purposes of illustrating aspects of the exemplary hardware, software, or a combination thereof, are capable of being substituted therein.

It will be appreciated that the system 100 of FIG. 1 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIG. 1 as a networked set of components, the system and method are capable of implementation on a stand-alone device adapted to perform the methods described herein.

As shown in FIG. 1, the system 100 includes a computer system 102, which is capable of implementing the exemplary method described below. The computer system 102 may include a computer server, workstation, personal computer, laptop computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like. The exemplary computer system 102 includes a processor 104, which performs the exemplary method by execution of processing instructions 106 which are stored in memory 108 connected to the processor 104, as well as controlling the overall operation of the computer system 102.

The instructions 106 include a trip extractor 110 that receives validation information 137 from one or more automatic ticketing validation systems 136 associated with the transportation network 134. The validation information 137 is utilized by the trip extractor 110 to extract a trip 111 that a traveler actually took on the transportation network 134, which trip 111 may then be added to the set of trips 138, as discussed below. The validation information 137 may include, for example, timestamps 140, locations 141, ticket identification 145, and the like. The trip extractor 110 may process the received validation information 137 to determine an origin 142 and a destination 144 for the particular ticket identification 145 associated with a particular traveler. That is, the trip extractor 110 may derive, from the timestamps 140 and locations 141 contained in the validation information 137, i.e., the origin 142 of the traveler, and deduce, calculate, or otherwise determine the corresponding destination 144 of that traveler. The trip extractor 110 may then output a trip 111 that corresponds to the actual journey the corresponding traveler (i.e., ticket identification 145) took on the transportation system 134. Various embodiments of the subject application may utilize the collection of additional information from the automatic ticketing validation system 136, e.g., validation sequences (set of boarding and alighting validations with corresponding timestamps over a particular period of time), or the like, from which additional information trips 111 may be extracted by the trip extractor 110.

The instructions 106 include a preference converter 112 that implicitly derives pairwise preferences 192 from a data set of trips 138 accessible by the computer system 102. That is, the preference converter 112 determines a set of pairwise preferences 192 from information about trips 111 extracted by the trip extractor 110 from the validation information 137 from automatic ticketing validation systems 136, e.g., the times 140, origins 142, and destinations 144 of actual travelers on the associated transportation network 134, as discussed below. According to one embodiment, the pairwise preferences 192 are inferred from the set of trips 138, e.g., a preferred trip is one that a large number of travelers selected at a specific time. The pairwise preferences 192 may include, for example, traffic preferences (e.g., traveler avoids buses), temporal and/or spatial (time, route, etc.) inferred from data set 138. That is, it will be appreciated that the preferences 192 correspond to the reason (implicit/explicit) that a traveler preferred a particular route (trip 111) at a particular time.

The instructions 106 may also include a modeling component 114 that generates one or more sets of dynamic latent variables 194 characterizing any given trip 111 in the associated transportation network 134. The modeling component 114 may process each trip 111 in the set of trips 138 actually taken or possible on the transportation network 134 (e.g., any origin/destination pair and the various intervening stops therebetween) to generate one or more sets of dynamic latent variables 194 characterizing the journey between such pair or on the actual trip. The one or more dynamic latent variable sets 194 may correspond to sets expressing passenger preferences as to services, i.e., take the bus, take the tram, take a train, sets expressing passenger preferences for change points, i.e., where to get of the service, where to get on the service, etc.

In addition, the instructions 106 may also include a ranking function calculator 116 that calculates a ranking function 190 for re-ranking trips 111 output by a journey planner 158 in response to a query, i.e., a trip request 162 from an associated user. The ranking function 190 may be determined based upon validation information 137 and the corresponding trips 111 of actual travelers of the transportation network 134. For each query, or trip request 162, a ranking function 190 may be calculated to rank all trips 111 that have the origin 168, destination 170 and departure time 172 corresponding to the trip request 162. The ranking function 190 calculated by the ranking function calculator 116 may further be determined using preferences 192 and dynamic latent variables 194 associated with the travelers and/or transportation network 134, as discussed in greater detail below.

In accordance with one embodiment, when a passenger takes a journey J to travel from origin o to destination d at starting time $t_s$, she implicitly prefers this journey to others at this moment of the day. This implicit feedback may then be used to learn the ranking function, by transforming this preference into an explicit set of pair-wise trip preferences.

Algorithm 1, set forth below, instantiates these preferences by using the journey planner 158 and a set T of observed journeys. For any real journey J matching the query Q=(o,d,$t_s$), Algorithm 1, operable via the computer system 102, uses the planner 158 to retrieve the k-top candidates for Q and signs that J has been preferred to any of these candidates, except J itself if it happens to be in this set.

---

Algorithm 1
Algorithm 1 Rank learning algorithm.

---

Require: Collection $\mathcal{T}$ of passenger journeys $\mathcal{J} = (S, \mathcal{C})$
Require: Journey planner P with k-top recommendations
 1:  $S = \emptyset$
 2:  for each $\mathcal{J} \in \mathcal{T}$ do
 3:   Assign journey $\mathcal{J}$ to a query Q = (o = $b_1$, d = $a_n$, $t_s$ = $t_1^b$)
 4:   Query the planner P with query Q
 5:   Retrieve k-top trips as a list L
 6:   for each $\mathcal{J}' \in L, \mathcal{J}' \neq \mathcal{J}$ do
 7:    Add (Q, x($\mathcal{J}'$)≻x($\mathcal{J}'$)) to $S$
 8:   end for
 9:  end for
10:  Learn ranking model f(x) with $S$
11:  return M

---

Algorithm 1 tests a journey J for matching a recommended one J'. We apply the strict definition, according to which J and J' follow the same sequence of PT services. If $S_J=\{l_1, \ldots, l_n\}$ and $S_{J'}=\{l'_1, \ldots, l'_n\}$, then J matches J' if $s_i=s'_i \wedge b_i=b'_i \wedge a_i=a'_i$, for all i=1, . . . , n.

In the re-ranking scenario, the journey planner 158 does not change the way it works. Upon user query, it generates k-top candidate trips; these trip candidates are then re-ranking using the ranking function M learned with Algorithm 1.

To learn a ranking function 190 from pairwise preferences 192, a feature vector x is created for each journey J where any feature is defined as a function of the journey J and the user query Q it would answer. As user preferences change over time, the ranking or trips/journeys should take into account the temporal aspect. Accordingly, the systems and methods described herein provide an approach to learn a unique ranking function $f(x)$ while feature extraction is time-dependent. Thus, it will be appreciated that the function $f$ on two queries Q=(o, d, $t_s$) and Q'=(o, d, $t'_s$) with the same o and d may produce different rankings if $t_s$ and $t'_s$ are different.

Passenger journeys form a set of pairwise preferences 192 that are used in accordance with the systems and methods set forth herein to learn a ranking function $f$. Any pairwise method uses the labeled data of query $Q_i$, $(x_{i,1}, y_{i,1})$, . . . , $(x_{i,m_i}, y_{i,m_i})$, i=1, . . . , N=|T|, to create preference pairs of feature vectors. For example, if $x_{i,j}$ has a higher grade than $x_{i,k}$ ($y_{i,j} > y_{i,k}$), then $x_{i,j} \succ x_{i,k}$ becomes a preference pair, which means that $x_{i,j}$ is ahead of $x_{i,k}$. The preference pairs can be viewed as instances and labels in a new classification problem, where $x_{i,j} \succ x_{i,k}$ is a positive instance.

It will be appreciated that any suitable classification method can be used to train a classifier $f(x)$ which is then used in ranking. More precisely, trips/journeys are assigned scores by $f(x)$ and sorted by the scores. Training of a good model for ranking is realized by training of a good model for pairwise classification. The loss function in learning is pairwise because it is defined on a pair of feature vectors.

The pairwise approach is adopted in many methods, including for example and without limitation Ranking SVM, RankBoost, RankNet, IR SVM, GBRank, LambdaRank, and others. In the following GBRank, as described in Zheng, Zhaohui and Chen, Keke and Sun, Gordon and Zha, Hongyuan. A Regression Framework for Learning Ranking Functions Using Relative Relevance Judgments. Proc. SIGIR '07, pages 287-294, New York, N.Y., USA, 2007. ACM, is adopted as one of popular pairwise methods currently used. GBRank takes preference pairs as training data, $\{x_i^1, x_i^2\}$, $x_i^1 \succ x_i^2$, i=1, . . . , N. and uses the parametric pairwise loss function $$L(f) = \frac{1}{2} \Sigma_{i=1}^{N} (\max\{0, \tau - (f(x_i^1) - f(x_i^2))\})^2,$$

where $f(x)$ is the ranking function and $\tau$ is a parameter, $0 < \tau \leq 1$. The loss is 0 if $f(x_i^1)$ is larger than $f(x_i^2) + \tau$, otherwise, the incurred loss is $\frac{1}{2}(f(x_i^2) - f(x_i^1) + \tau)^2$.

To optimize the loss function with respect to the training instances, the Functional Gradient Decent is deployed. Treating all $f(x_i^1)$, $f(x_i^2)$, i=1, . . . , N as variables; the gradient of L($f$) is computed with respect to the training instances as follows:

$$-\max\{0, f(x_i^2) - f(x_i^1) + \tau\}, \max\{0, f(x_i^2) - f(x_i^1) + \tau\},$$
$$i=1, \ldots, N.$$

If $f(x_i^1) - f(x_i^2) \geq \tau$, the corresponding loss is zero, and there is no need to change the ranking function 190. If $f(x_i^1) - f(x_i^2) < \tau$, the loss is non-zero, and the ranking function is updated using the Gradient Descent:

$$f_k(x) = f_{k-1}(x) - \nu \Delta L(f_k(x)),$$

where $f_k(x)$ and $f_{k-1}(x)$ denote the values of $f(x)$ at k-th and (k−1)-th iterations, respectively, v is the learning rate.

At the k-th iteration of the learning, GBRank collects all the pairs with non-zero losses $\{(x_i^1, f_{k-1}(x_i^2) + \tau), (x_i^2, f_{k-1}(x_i^1) + \tau)\}$ and employs Gradient Boosting Tree [6] to learn a regression model $g_k(x)$ that can make prediction on the regression data. The learned model $g_k(x)$ is then linearly combined with the existing model $f_{k-1}(x)$ to create a new model $f_k(x)$ as follows $$f_k(x) = \frac{kf_{k-1}(x) + \beta_k g_k(x)}{k+1},$$

with $\beta_k$ as a shrinkage factor [16].

Returning to FIG. 1, the instructions 106 may further include a re-ranking component 118 configured to apply the ranking function 190 to a k-top list 164 output by a journey planner 158 in response to a corresponding trip request 162. The re-ranking component 118 may utilize the ranking function 190 to generate a re-ranked k-top list 165 of the trips 111 in the k-top list 164 output by the journey planner 158, thereby ranking the trips 111 in the list 164 based upon the preferences 192 of real travelers as applied to the origin 168, destination 170, departure time 172, and service preference 174 of the trip request 162. The re-ranked k-top list 165 may then be communicated to the associated user, as discussed below.

The system 100 may further include the journey planner 158 equipped with a journey planning engine 160. According to one embodiment contemplated herein, the journey planning engine 160 determines a set of candidate trips for a user to take, i.e., one or more paths between a selected origin 168 and a selected destination 170. As will be appreciated, the journey planner 158 may facilitate the determination of one or more paths between stops 143 associated with the selected origin 168 and destination 170, using the routes 148, schedules 150, durations 154, walking distances 156, stops 143, and services 152 (e.g., bus, train, subway, etc.) associated with a transportation system 134. The journey planner 158 may determine one or more paths between the selected origin 168 and destination 179 as provided by the user and output a top list (k-list) of trips 164. It will be appreciated that when determining a trip between the selected origin 168 and the destination 170, the journey planner 158 may use an abstract model of the transportation network 134, i.e., a model based on the routes 148 and schedules 150, as well as other information available to the journey planner 158 regarding the transportation network 134, user preferences, and the like. The journey planner 158 may have access to the data stored on the database 130 in communication with the computer system 102, may have data related to the transportation system 134, e.g., routes 148, schedules 150, stops 143, services 152, etc., stored on a separate database (not shown) in communication therewith. The journey planner 158 may further be in communication with an associated database (not shown) that stores previously generated lists of journeys or trips responsive to particular origin/destination pairs, and the illustration in FIG. 1 is intended as one example implementation of the aforementioned journey planner 158.

As will be appreciated, a suitable journey planner 158 for a public transportation network 134 is configured to provide information about available public transport journeys, or trips. Input for the journey planner 158 includes an origin o 168, a destination d 170 and starting time s (departure time 172), and uses the journey planning engine 160 to find a route from o to d using specified services (174) using available services of the transportation network 134. It will be understood that the choice of routes for the journey planner 158 on a public transportation network 134 is more constrained than for a road route planner, moreover it is not only about choosing a route but also about choosing a service on that route.

The journey planner 158 finds one or more suggested journeys between an origin and a destination. In accordance with one embodiment, the planner 158 uses a search algorithm to search a graph of nodes (representing access points to the transport network 134) and edges (representing possible journeys between points). Different weightings such as distance, cost or accessibility may be associated with each edge.

Searches may be optimised on different criteria, for example fastest, shortest, least changes, cheapest. They may be constrained for example to leave or arrive at a certain time, to avoid certain waypoints, etc. Such a planner 158 usually disposes multiple sources of public and private information, including the detailed network description, available routes, stop locations, the service schedule, walking distances etc. in order to better answer the user queries, i.e., trip requests 162.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 120, 122 allow the computer to communicate with other devices via a computer network, and may comprise a modulator/demodulator (MODEM). Memory 108 may store data the processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method outlined in FIG. 4.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The computer system 102 also includes one or more input/output (I/O) interface devices 120 and 122 for communicating with external devices. The I/O interface 120 may communicate with one or more of a display device 124, for displaying information, and a user input device 126, such as a keyboard or touch or writable screen, for inputting text, and/or a cursor control device, such as mouse, trackball, or the like, for communicating user input information and command selections to the processor 104. The various components of the computer system 102 may all be connected by a data/control bus 128. The processor 104 of the computer system 102 is in communication with an associated database 130 via a link 132. A suitable communications link 132 may include, for example, the public switched telephone network, a proprietary communications network, infrared, optical, or other suitable wired or wireless data transmission communications. The database 130 is capable of implementation on components of the computer system 102, e.g., stored in local memory 108, i.e., on hard drives, virtual drives, or the like, or on remote memory accessible to the computer system 102.

The associated database 130 corresponds to any organized collections of data (e.g., validation information, transportation system information (e.g., stops, nodes or stations, schedules, routes), crowdsourcing information (e.g., possible paths, durations, frequency of travel, expected transfer times), and the like) used for one or more purposes. Implementation of the associated database 130 is capable of occurring on any mass storage device(s), for example, magnetic storage drives, a hard disk drive, optical storage devices, flash memory devices, or a suitable combination thereof. The associated database 130 may be implemented as a component of the computer system 102, e.g., resident in memory 108, or the like.

In one embodiment, the associated database 130 may include data corresponding to an associated transportation system 134, a collection of routes 148 (a sequence of stops at transportation nodes to be made by an individual vehicle along of a course of travel available on the transportation system 134), schedules 150 for each of these routes 148, transportation nodes, such as stations or stops 143, paths (i.e., a sequence of successive origins and destinations between a first origin and the last destination, services 152, duration 154, walking distances 156, and validation sequence information 136. For example, in the case of a public transportation system, the associated database 130 may include information relating to the public transportation system 134 such as public transportation routes (e.g., a known sequence of scheduled stops by an individual bus, subway, train, etc.) 148, schedules 150 that pertain to the arrival/departure times of buses, trams, subways, etc., of the transportation system 134 for these routes 148, public transportation stops (or stations) 143, i.e., fixed locations, or nodes, that are linked by the transportation system 134, and a set of paths between two stops 143, each path being associable with one or more transportation routes 148 (e.g., a path may include beginning a journey by train at a first station (origin), riding the train (along the train's scheduled route) to a second station, transferring to a bus at the second station, and riding the bus (along the bus's scheduled route) so as to alight at a third station (destination)), change counts 198 corresponding to a number of changes between services (bus/tram/train) offered by the transportation system 134.

The database 130 may further include a set 138 of one or more trips 111, corresponding to actual trips taken by travelers of the transportation system 134. Each trip 111 in the set of trips 138 output by the trip extractor 110 from received validation information 137 may include, for example, timestamps 140, origins 142, destinations 144, and the like. It will be appreciated that other information associated with a particular trip 111 may be received in the validation information 137 and extracted by the trip extractor 110 for storage in the associated database 130. For example, a set of ticket validation sequences that may be derived from the validation information 137 collected from various collection components (e.g., the automatic ticketing validation system 160 located at stations or on vehicles of the transportation system 134. In such an example, the validation sequences may include, for example, timestamps representative of respective sequences of boarding and alighting timestamps, locations representative of origins and destinations corresponding to the timestamps, sequence tags, and a ticket identifier corresponding to each validation sequence.

For example, in the context of a public transportation system, the validation information 137 may pertain to travelers, such as each ticket's unique identification 145 (e.g., the ticket identification 145 may be derived from a smart card, a transit card, transit ticket, or the like, that cannot be rewritten or otherwise altered by the user (anti-counterfeiting properties)), locations 141 (origin and destination locations), sequence tags (first use, correspondence use, etc.,), timestamps 140 associated with the transfer times between an origin and a destination for that particular validation sequence. That is, each validation sequence may include the time of entry of the traveler on the public transportation network 134 along with the corresponding location 141 or route 148 (i.e., stop 143 on the route 148) at which the traveler boarded or alighted, and the like. While each traveler on a public transport system is generally a person, travelers of other networked transportation systems may include goods or other inanimate objects.

Each location 141 of the validation information 137 may include one or more of a route identifier e.g., a route number, a transportation node identifier, e.g., a stop number, an address, GPS coordinates, or other geographical identification information associated with the location. The time component of the stamp 140 may include one or more of a time of day, a day, a date, or other temporal information corresponding to the timestamp 140. The validation information 137 collected and used in the various embodiments contemplated herein may thus be ticketing data, collected via usage of prepaid cards, single use transit tickets, reloadable transit cards, or other ticketing devices. The above references sequence tags may reflect where or when in the a particular validation sequence the boarding or alighting of the traveler occurred, i.e., a "First" tag may indicate the first use of the ticket identification 145, whereas a "Correspondence" tag may indicate the second and each subsequent use of the ticket identification 145 within a specified time period. The database 130 may further include sets of dynamic latent variables 194 derived or determined from pairwise preferences 192 ascertained from the validation information 137 and actual trips/journeys 111 taken by travelers/passengers/users of the public transportation system 134.

The validation information 137 may be collected from a plurality of locations on the associated transportation system 134. As briefly discussed above, each of these locations may correspond to one of a finite set of locations (e.g., stations, stops, etc.) connected by the transportation system 134, or vehicles which travel along routes 148 of the transportation system 134. It will be appreciated that the collection of such information 137 may be performed by ticket validation machines for fare collection, i.e., automatic ticket validation systems 136 at each respective location, such as smart card readers, magnetic card readers, input terminals, ticket dispensers, ticket readers, and the like. It will be appreciated that such automatic ticket validation systems may be implemented at stations, on vehicles, etc., and may represent automatic fare collection subsystems.

Various travelers on the transportation system 134 may use transportation cards/tickets. Such cards/tickets may be used to pay for or otherwise enable travel on the transportation system 134 and thus are scanned, read, inserted in, or otherwise detected by the automatic ticket validation systems 136 as the travelers travel through the transportation system 134 from an origin location 142 to a destination location 144. Such transportation cards may include smart card-like capabilities, e.g., microchip transmissions, magnetically stored data, and the like. In such embodiments, the automatic ticket validation systems 136 communicate validation information 136 to the computer system 102 via link 146. A suitable communications link 146 may include, for example, the public switched telephone network, a proprietary communications network, infrared, optical, or any other suitable wired or wireless data transmission communications.

It will be appreciated that additional information may be collected by the automatic ticket validation systems 136 corresponding to ticketing operations including transportation usage data, ticketing receipt data, congestion data, and the like. According to one embodiment, both entries and exits of passengers on and off vehicles or nodes of the transportation system 134 may be collected as validation information 137. Entry-only systems, in contrast, may allow for the collection of electronic validation records pertaining only to the entry of a traveler on a vehicle or at an origin node of the transportation system 134. While the destinations of travelers in an entry-exit system may be discernible from the automatic ticketing validation data, i.e., the validation information 137 collected by the automatic ticket validation systems 136, destinations of passengers in an entry-only automatic ticketing validation system 136 may be discerned through inferences based upon non-validation data (e.g., transportation system routes and schedules, event occurrences (sports, concerts, etc.), or the like) and traveler assumptions.

The systems and methods described herein may use one-trip tickets as well as prepaid cards, which are reflected in the ticket identification 145 included in the collected validation information 137. A one trip ticket may have a fixed validation time, i.e., a period of time during which the ticket remains valid for use by a traveler. For example, in entry-only systems, the time during which the ticket is valid may be limited to 1 hour from the time of issuance/purchase, during which time travelers may change vehicles within the transportation network 134 without incurring an additional charge. The first validation of such a ticket may be identified by a sequence tag indicating 'First', whereas the second and subsequent validations during this validation time may be identified by a sequence tag indicating 'Correspondence'. The automatic ticketing validation systems 136 may allow for the use of multiple entry cards, which may provide for multiple entries by a traveler and long-term permanent cards to requesting travelers. It will be appreciated that the use of multiple entry cards may permit tracking traveling data of each card holding traveler, as well as allowing for time-based analysis of such travelers.

The automatic ticketing validation systems 136 may allow for location identification, corresponding to the entry or the entry and exit of a traveler. For example, the automatic ticketing validation systems 136 may enable each validation of a ticket to include a ticket ID 145, a timestamp 140 and a correspondence tag. Additionally, the automatic ticketing validation systems 136 can use automatic vehicle location subsystems to associate a ticket validation with the public transportation route 148, stop identifier (e.g., stop 143) and direction. Other methods for collecting validation information 137 may alternatively or additionally be used, including, mobile communication events, e.g., time-stamped antenna authentication sequences or other observations of the intersecting of scheduled activities and traveler schedules. The ticket validations, i.e., the validation information 137 collected in the automatic ticketing validation systems 136 may provide information for understanding the traveler flows in the transportation network 134. Information in a typical installation can be analyzed in order to provide valuable insights for the transit and public transportation agencies and assist in decision making processes.

The validation information 137 associated with the implementation of FIG. 1 is for example purposes only. Other applications outside of the public transportation example are also contemplated. For example, toll-road monitoring and management systems may also take advantage of the subject systems and methods, whereby validation information 137 is collected at toll-booths, upon entry and exit of a vehicle with respect to the associated toll road. Other embodiments, e.g., hospital monitoring of patient/employee entries and exits, secure facility monitoring, and the like, are also contemplated.

As depicted in FIG. 1, the trip re-ranking system 100 may include or communicate with one or more user access devices 176, depicted in FIG. 1 as a portable communication device, e.g., a mobile smartphone, which is capable of interacting with the computer system 102 via a suitable link 184. Device 176 is representative of any personal computing device, such as a personal computer, a netbook computer, a laptop computer, a workstation computer, a personal data assistant, a web-enabled cellular telephone, a tablet computer, a proprietary network device, or other web-enabled electronic device. The data communications link 184 between the computer system 102 and the user access device 176 may be accomplished via any suitable channel of data communications such as wireless communications, for example Bluetooth, WiMAX, 802.11a, 802.11b, 802.11g, 802.11(x), a proprietary communications network, infrared, optical, the public switched telephone network, or any suitable wireless data transmission system, or wired communications.

The user device 176 may include a processor 182, system memory 178, system storage, buses that couple various system components including the system memory 178 to the processing unit 182, and the like. The user device 176 may be suitably configured to interact with the computer system 102, to access the database 130, submit trip requests 162, receive a re-ranked k-top list of trip plans 165, and the like. Specifically, the user device 176 may include a web-browser, dedicated application, or other thin client interface 180, e.g., stored in memory 178, which is operable to interact with the computer system 102. The thin client 180 may be suitably configured to display a graphical representation of the associated transportation system 134, routes 148, schedules 150, services 152, and the like. Processor 182 and memory 178 can be configured as set forth above with respect to the processor 104 and memory 108 of the computer system 102.

In accordance with one embodiment, a user of the system 100, e.g., a person wishing to determine a suitable trip between a desired origin 168 and a desired destination 170 at a selected departure time 172, may submit a trip request 162 for processing by the computer system 102. The trip request 162 may be submitted via the link 184 or directly input to system 102. The trip request 162 serves as a request for a list of top-rated trips 165 between a selected origin 168 (corresponding to a stop/station 143 on the system 134) and a selected destination 170 (corresponding to another stop/station 143), which may include any number of intervening stations 143 stored in the database 130. In such an embodiment, the trip request 162 may include an origin (O) 168, a destination (D) 170, desired departure time 170, and optionally, a selected service preference 174 (e.g., bus only, tram only, subway only, etc.). The trip request 162 may be input by the user via access to the thin client 180 operable on the user device 176 in data communication with the computer system 102, via user interactions with the user input device 126 with results displayed on the display device 124, or the like.

The trip request 162 may then be sent to the journey planner 158 for a determination as to the k-top list of trips 164 by the associated journey planning engine 160. This k-top list of trips 164 may then be processed by re-ranking component 118 of the computer system 102 to re-rank the trips 111 into the re-ranked k-top list of trips 165. Thereafter, the re-ranked k-top list of trips 165 may be communicated, via the communications link 184, from the computer system 102 to the user device 176, to the display 124, or the like.

Figure 2A:
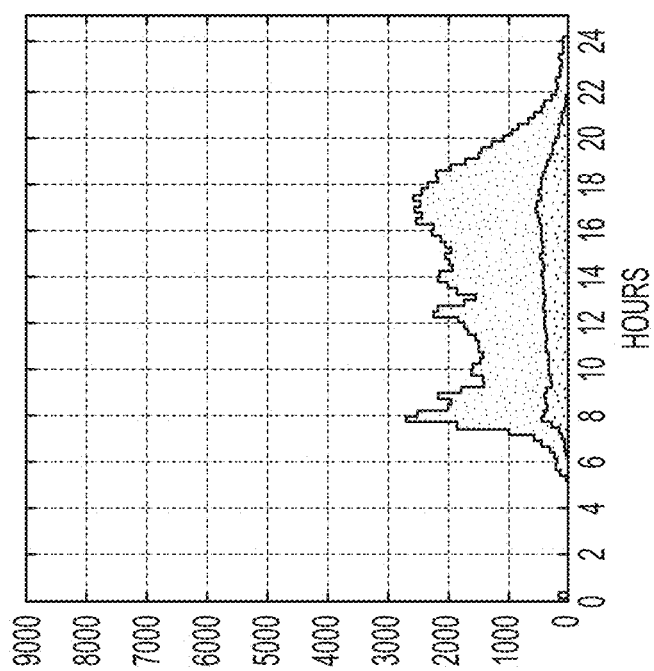
FIG. 2A illustrates a distribution of journey counts for weekdays on an example transportation network according to one embodiment of the subject application.
Figure 2B:
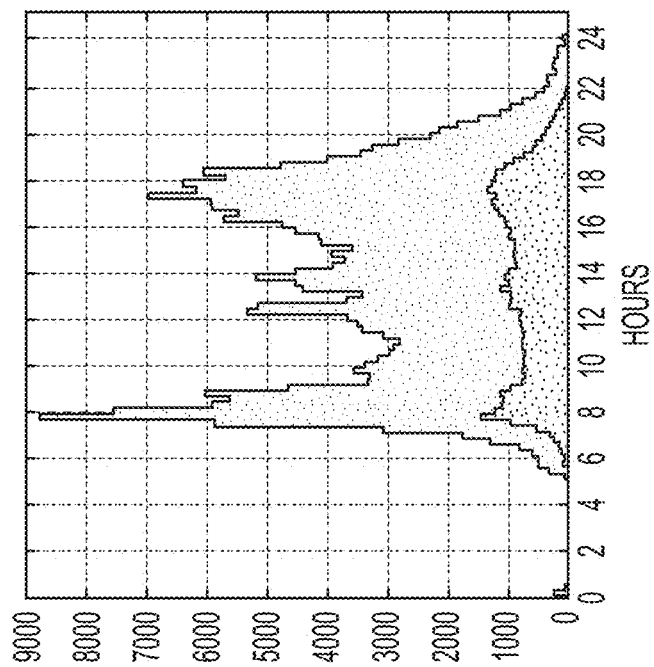
FIG. 2B illustrates a distribution of journey counts for weekends on the example transportation network depicted in FIG. 2A.

It will be appreciated that any public transportation network, including the transportation system 134 of FIG. 1, offers a number of services (bus and tram lines, trains, etc). An individual passenger trip or journey J represents a sequence of public transporation services its takes and changes between them. It will be understood that the the terms "journey" and "trip", unless otherwise noted, are used interchangeably hereinafter. FIG. 2A illustrates journey counts for working days and FIG. 2B illustrates journey counts for weekends. Lighter counts correspond to transit counts and darker counts correspond to direct counts.

The public transportation services of J is a sequence $S_J=\{l_1, \ldots, l_n\}$, $n \geq 1$, where any leg $l_i$ is a tuple $(s_i, b_i, a_i, t_i^b, t_i^a)$, where $s_i$ is a service identifier (a bus number, for example); $b_i$ and $a_i$ are boarding and alighting stop identifiers, $t_i^b$, $t_i^a$ are boarding and alighting timestamps. A trip is direct if n=1, or transit otherwise.

Any transit journey defines n−1 changes which often refer to some waiting and/or walking between the services. According to one embodiment, the sequence of changes may be defined as $C_J=\{c_1, \ldots, c_{n-1}\}$, $n \geq 1$, where any change $c_i$ is uniquely defined by two successive service legs $l_i$ and $l_{i+1}$, as follows: $c_i=(a_i, b_{i+i}, t_i^a, t_{i+1}^b)$. It should be noted that the journey change $C_J$ disregards any walking before and after the journey.

Accordingly, it will be appreciated that the systems and methods set forth herein consider a journey J as an explicit answer to an implicit travel query $Q=(o=b_1, d=e_n, t_s=t_1^b)$ or $Q=(o=b_1, d=a_n, t_f=t_n^a)$. It will further be appreciated that this aspect differentiates the trip planning from document retrieval where, instead, explicit user queries receive implicit relevance user feedback in the form of click-through data.

The above-observations are illustrated more fully in FIGS. 3A and 3B. FIGS. 3A and 3B show the travel time and average trip counts for 5-top trips in Nancy, France illustrate how the preference of different trips changes during the day for an example (o, d) location pair in Nancy. Accordingly, FIG. 3A depicts the 5-top transit journeys for the example (o, d) location pair. FIG. 3B illustrates the travel time and average trip counts for the 5-top trips for the example (o, d) location pair. As shown, each of the 5 trips is a transit trip with one change, i.e., transfer. It will be appreciated that FIGS. 3A and 3B illustrate that travelers' preferences vary during the day. The journey planner 158 recommends the trip 304 for the fastest trip query. As shown, the recommended trip 302 is not the fastest nor the most frequently chosen one, and further, the trip 302 is the most frequent during the times commonly associated with lunch, despite the trip 302 being one of the slowest trips.

Figure 4A:
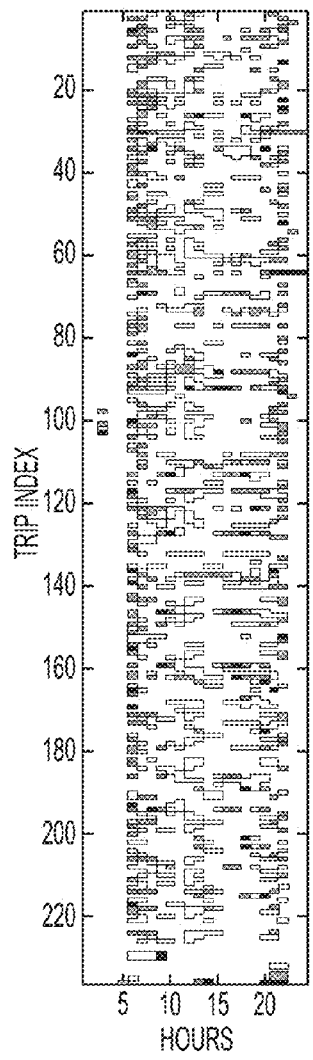
FIGS. 4A, 4B, and 4C provide an illustration of a set of trips in one example transportation network, FIG. 4A depicting varying user preferences for frequent trips, FIG. 4B depicting trip distances, and FIG. 4C depicting trip recommendations by a journey/trip planner.
Figure 4B:
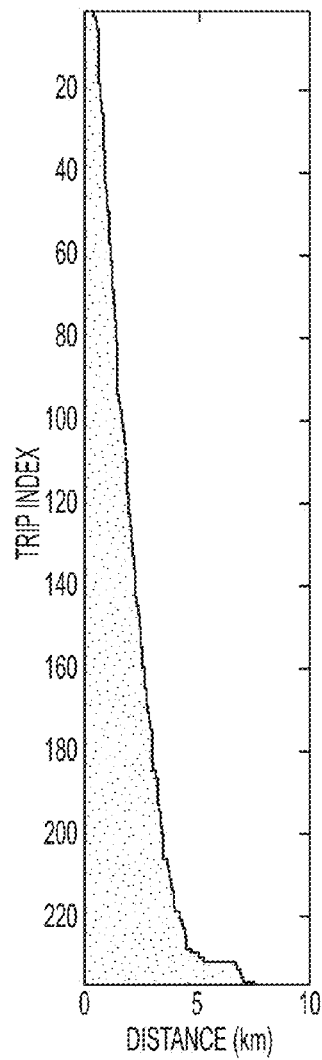
Figure 4C:
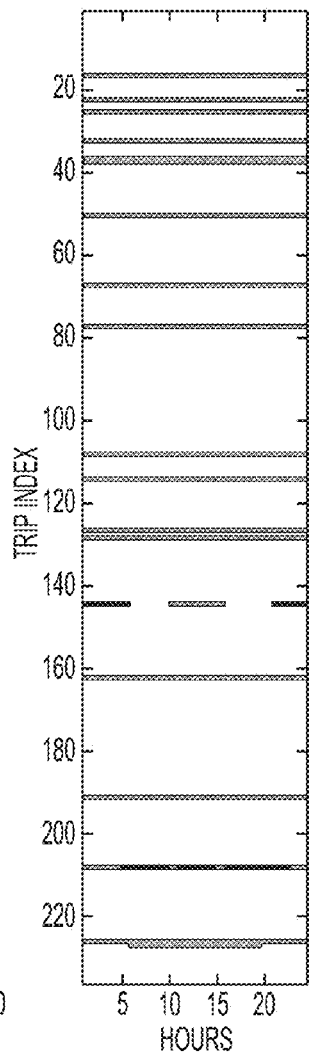

FIGS. 4A-4C provide a more general picture of the user preferences. That is, FIGS. 4A, 4B, and 4C show the 240 most frequent transit trips in Nancy. For each trip, FIG. 4A uses the different colors to show how user preferences change during the day. The globally most frequently used trip is shown in unboxed in white. Second, third, forth and fifth preferences are shown boxed in white, boxed with hash going up from left, boxed with hash going down from left, and boxed with dotted, respectively. Trips are sorted by the distance between the origin and destination. Since different trips give different distances, the Manhattan distance is used, as demonstrated in FIG. 4B.

Short trips expose a higher variability. As FIG. 4A shows, the second choices are more visible (boxed with white) during the morning rush hours. Even less frequent paths are more frequent before the morning rush hours and after the afternoon rush hours. Furthermore, the longest trips show the minimal variability of user choices. Finally, FIG. 4C illustrates how vary the trip variability by the trip planner for the same trips. It will be understood that recommendations by the planner 158 are static and do not reflect the changing user preferences.

Figure 5:
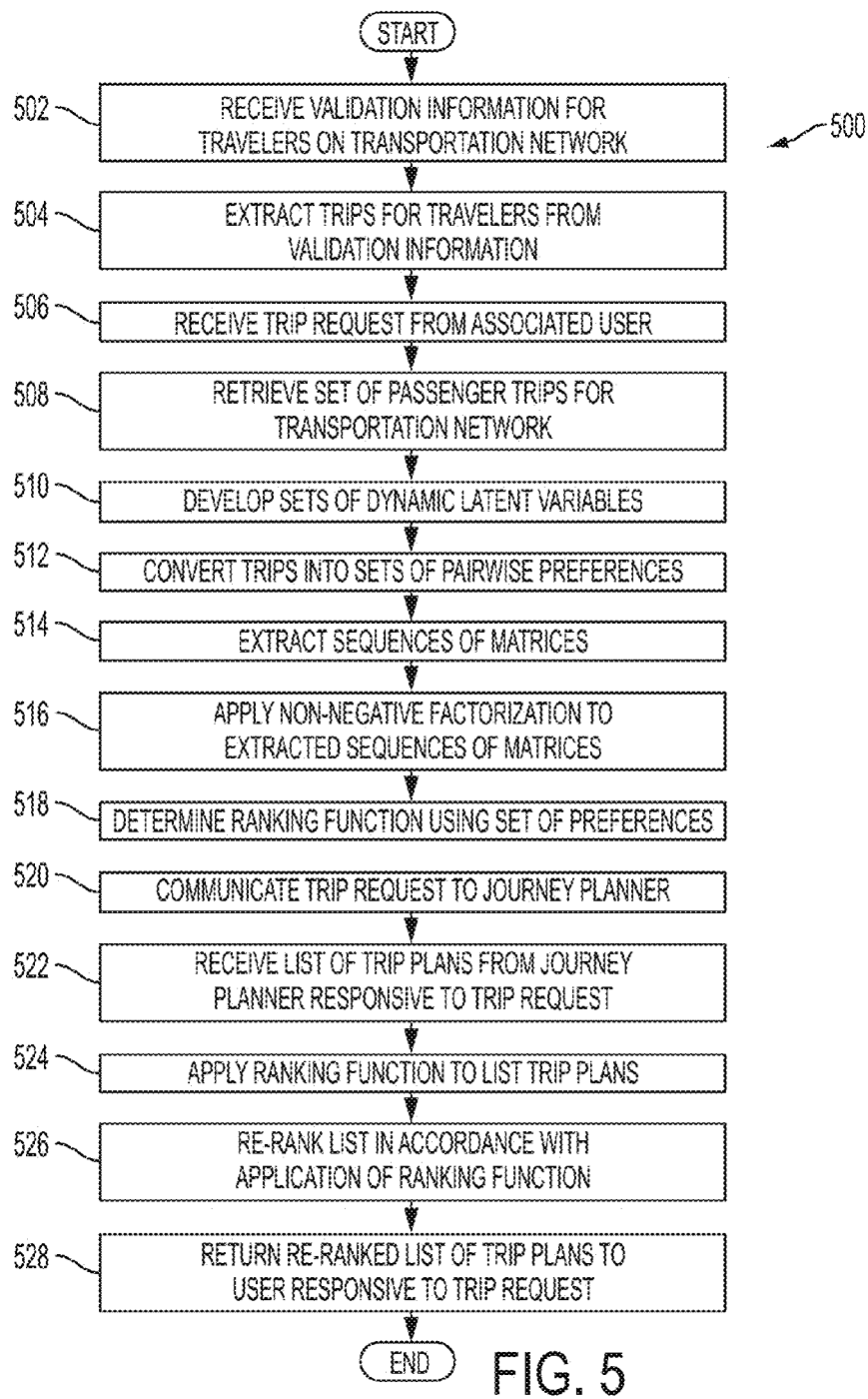
FIG. 5 is a flowchart which illustrates part of the method for re-ranking a trip on an associated transportation network in accordance with one aspect of the exemplary embodiment.

Turning now to FIG. 5, there is shown a flowchart 500 illustrating a method for re-ranking trips on an associated transportation network according to one embodiment. The methodology of FIG. 5 begins at 502, whereupon validation information 137 is received from at least one automatic ticketing validation systems 136, said validation information may include timestamps 140, locations 141 (e.g., stops 143) and ticket identifications 145. At 504, each trip 111 undertaken by a traveler, as indicated by the validation information 137, is extracted. Each trip 111 includes at least a timestamp 140, an origin 142, and a destination 144. The trip 111 may be extracted or otherwise determined by the trip extractor 110 from validation information 137 collected by one or more automatic ticketing validation systems 136.

At 508, a set of trips 138 for the associated transportation network 134 is retrieved from the associated database 130 corresponding to the received trip request 162 from the associated user. As discussed above, each trip 111 in the set 138 thereof corresponds to an actual journey taken by a traveler on the transportation network 134. According to one embodiment, each trip 111 forming the set of trips 138 includes a common origin 168, destination 170, and departure time 172, which also corresponds to the origin 168, destination 170 and departure time 172 of the received trip request 162. In one embodiment, the trip request 162 may specify a desired service 174, and the retrieved set of trips 138 may also be further limited to those trips 111 using the selected service 174.

At 510, a set of dynamic latent variables 194 characterizing any given trip 111 in the set of trips 138 on the transportation network 134 are developed by the modeling component 114 or other suitable component associated with the computer system 102. In accordance with one embodiment, sets of dynamic latent variables 194 are modeled with one or more of the sets expressing passenger preferences as to services on the associated transportation network 134 and one or more of the sets expressing passenger preferences for change points on the network 134.

At 512, the preference converter 112 or other suitable component associated with the computer system 102 converts the set of trips 138 into a set of pairwise preferences 192, in accordance with the determined set of dynamic latent variables 194. As discussed above, the preferences 192 may include, for example, traffic preferences (e.g., traveler avoids buses), temporal and/or spatial (time, route, etc.) inferred from data set 138. That is, it will be appreciated that the pairwise preferences 192 correspond to the reason (implicit/explicit) that a traveler preferred a particular route (trip 111) at a particular time.

At 514, sequences of services matrices and change points matrices are extracted from the trips/journeys 111 taken by travelers/passengers/users of the public transportation system 134. Non-negative matrix factorization is then applied to the extracted sequences of matrices at 516, so as to dynamically smooth the sequences of matrices. A ranking function 190 is then determined at 518 using the set of pairwise preferences 192 as characterized by the set of dynamic latent variables 194 via the ranking function calculator 116 or other suitable component associated with the system 100, as well as the dynamically smoothed non-negative matrix factorized sequences of matrices, as discussed more fully below with respect to Algorithm 2. According to one embodiment, the learning of the ranking function 190 at 518, as discussed above, may be performed via Algorithm 1.

At 520, the trip request 162 received from an associated user including a selected origin 168, a selected destination 170, a departure time 172, and, optionally, a preferred service 174 (e.g., bus, train/tram, direct, etc.) is communicated to the journey planner 158 for processing by the planning engine 160.

At 522, the re-ranking component 118 receives a k-top list of trips 164 from the journey planner 158 responsive to the trip request 162. The re-ranking component 118 then retrieves the ranking function 190 corresponding to the received query, i.e., trip request 162, and applies, at 524, the ranking function 190 to the retrieved k-top list of trips 164 to re-rank, at 526, the list in accordance with the applied ranking function 190. The re-ranked k-top list 165 is then returned, at 528, to the user responsive to the received trip request 162.

It will be appreciated that there exists a large number of explicit and implicit factors which influence the passenger choice. Accordingly, the systems and methods set forth in the subject application process every passenger trip to instantiate the set of pair-wise preferences. During the training, the method finds the optimal weights for different aspects/features which best explains the trip choices made by the passengers.

Figure 6:
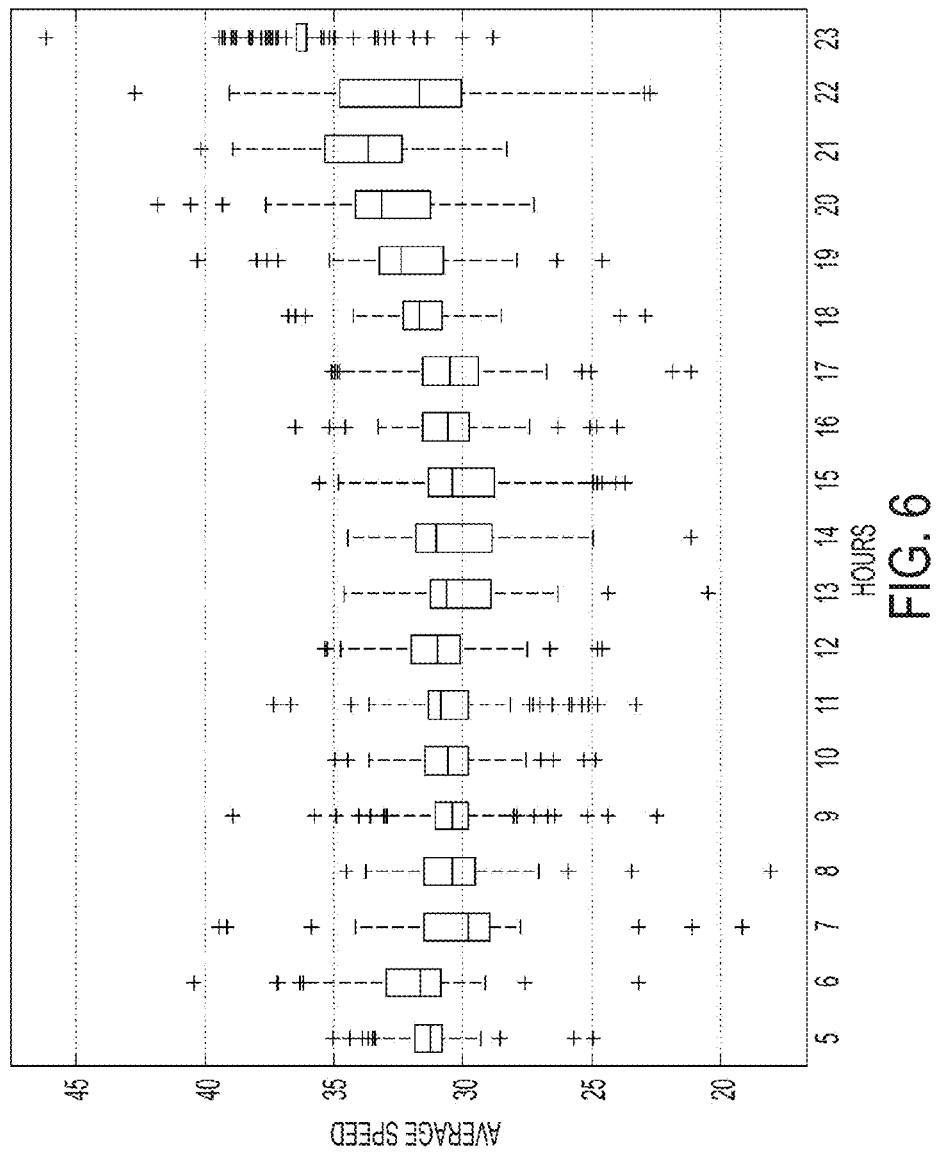
FIG. 6 shows a graph illustrating estimated means and variances of speed for a line of the transportation network.
Figure 7:
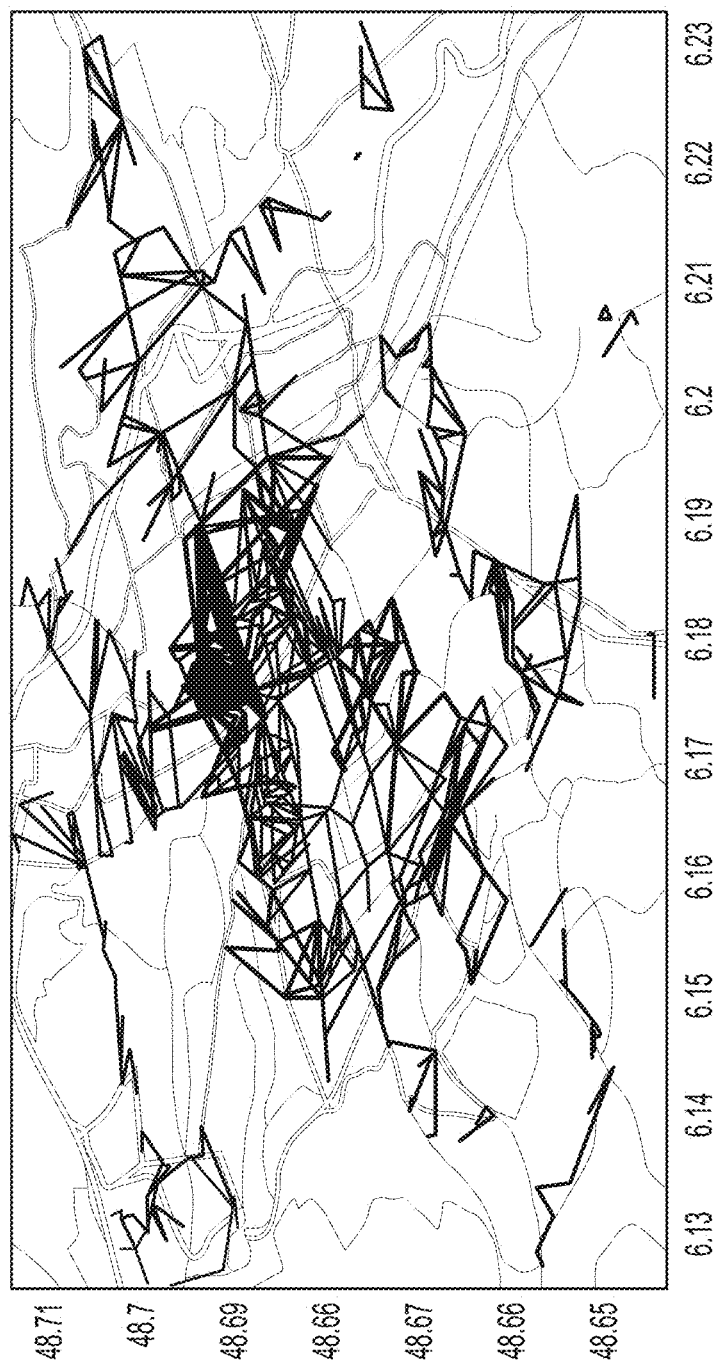
FIG. 7 illustrates a network of most frequently used changes for the example associated transportation network.

There are two groups of time-dependent features. First, global features are characteristics describing the whole journey, such as the travel time, the number of changes, the usage of specific types of transport (bus, train, tram, etc.), multi-modality, and the like. Second, are local features describing each service leg and change that comprise the journey. For each public transportation service, the estimated means and variance of the speed may be extracted when using this line at this time period, the average delay with respect to the schedule (see FIG. 6, which illustrates as an example, line 30 in Nancy: speed average, 25% and 75% quantiles, per hour). For each change point, additional characteristics are estimated, e.g., the walking distance, the closeness to a commercial zone or transportation hub, etc. FIG. 7 shows the network of most frequently used changes in Nancy.

Figure 8A:
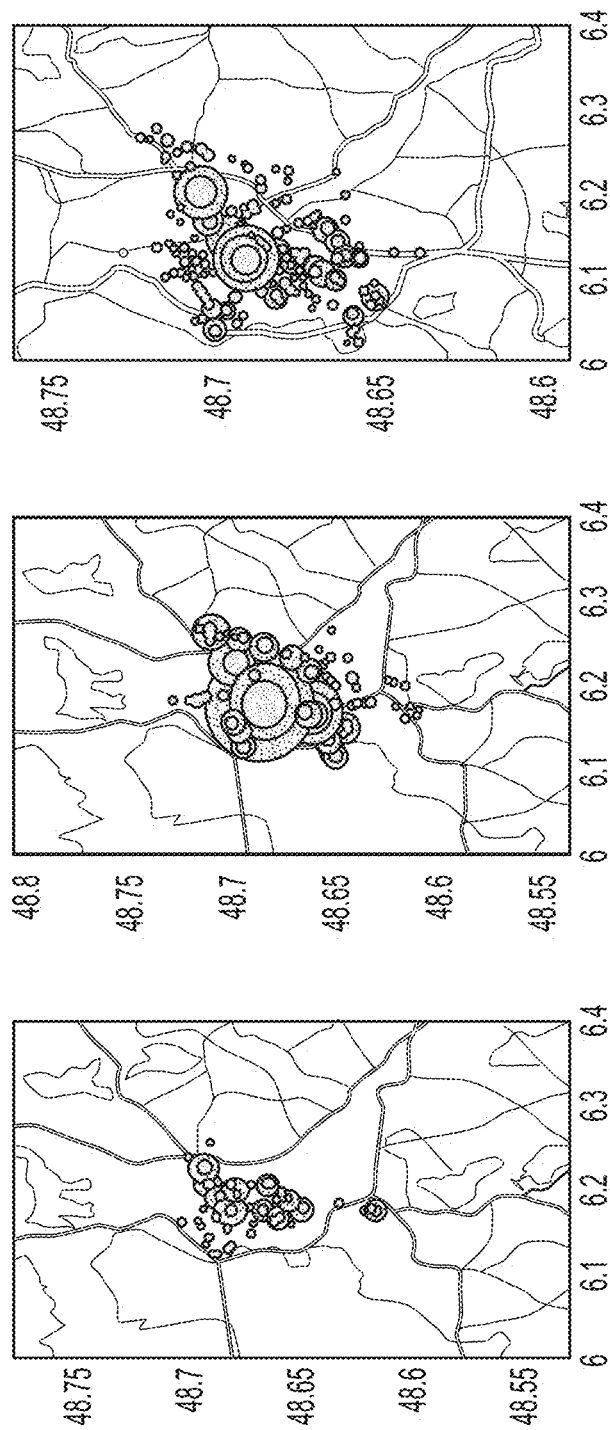
FIG. 8A depicts user change counts at selected times for the example associated transportation network.
Figure 8B:
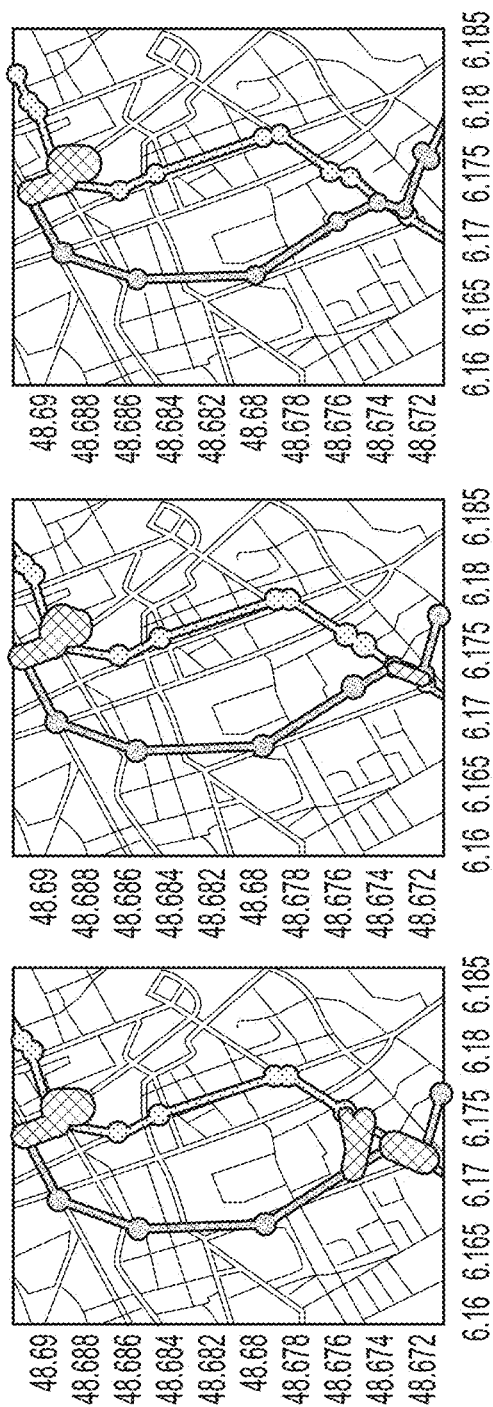
FIG. 8B depicts one transfer from a tram to a bus on the example associated transportation network from the counts illustrated in FIG. 8A.

Passengers make their traveling choices as a function of local information such as shops, services, street configuration and crossing, but also as a function of time. FIGS. 8A-8B show how the user change preferences change in time. FIG. 8A presents the total change counts in the entire network at 8 am, 1 pm and 6 pm. Apart from the absolute values, the geographic distribution considerably changes during the day. FIG. 8B shows a specific case of transfer from tram 1 to bus 23, again at 8 am, 1 pm and 6 pm. With two possible places where to make the change, it is easy to see that one place (in the city center) remains frequently used during all hours of the day, while the second place is used primarily during the morning hours.

Unfortunately, raw features of public transportation services and change counts that are collected and used for describing passenger journeys are ambiguous, noisy and have weak predictability. Accordingly, extracting of discriminant latent features from the initial data prior to the classification may be construed as the first step. Transfer counts like document words are non-negative, and the latent factor analysis can be addressed by non-negative matrix factorization. Accordingly, it will be understood that the subject systems and methods determine latent variables that are able to catch/acquire the user preferences and its corresponding temporal character.

Let n denote the number of stops in a public transportation system. All journeys in T are split in two collections of service and change observations, $A^s = \{l_i | l_i \in S_j, J \in T\}$ and $A^c = \{c_i | c_i \in C_j, J \in T\}$. In the following, it may be assumed for brevity working with a set of observations A; it may indicate service or change observations, or their sum.

If all observations in A are split into T time periods, a sequence of count matrices $A_t$, $t = 1, \ldots, T$, $A_t \in R_+^{n \times n}$ may be obtained at time period t, where $a_{ij}$ is the count of service or change during the period t.

Figure 9:
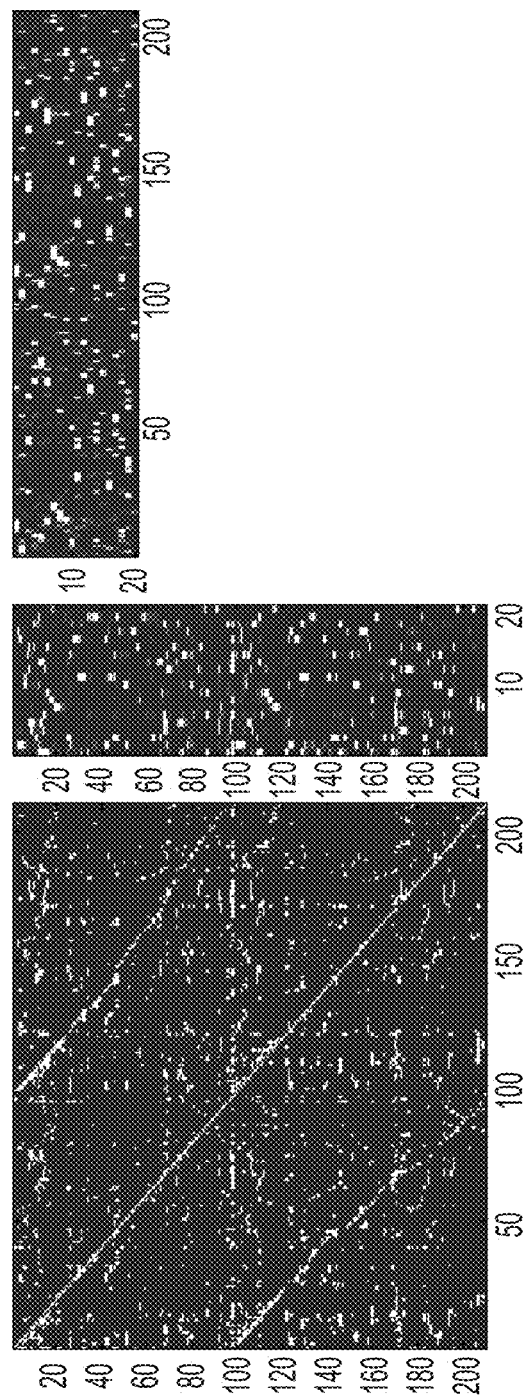
FIG. 9 depicts a graphical representation of a collapsed change matrix factorization in accordance with one aspect of an exemplary embodiment of the subject application.

Thereafter, T is set to 1, all observations from A are then collapsed in one matrix A. FIG. 9 illustrates the collapsed change matrix factorization in accordance with one embodiment of the subject application. Journey components, e.g., origin-destination pairs, extracted from ticket validation systems 136 are generally noisy and prone to many errors. Three main reasons for errors are the following: 1) errors due to wrong setup of validation machines; 2) wrong public transportation positioning (e.g., due to wrong alignment between, on one hand the validation machines 136 (bus boarded) which provide timestamps and card information and, on the other hand, GPS locations provided by AVL); and 3) card misuse by travellers.

Both service and change data are non-negative counts, and the non-negative matrix factorization (NMF) may be utilized as a method giving a great advantage for visualization and interpretation of non-negative data, as described more fully in Lee, Daniel D and Seung, H Sebastian. *Algorithms for non-negative matrix factorization*. Proc. NIPS'01, pages 556-562, 2001, the entire disclosure of which is incorporated by reference herein. A suitable example of such visualization and interpretation may be found in the above-identified reference. Such non-negative matrix factorization may be efficiently computed by formulating the penalized optimization problem and using modern gradient-descent algorithms, such as the algorithms described in Hoyer, Patrik O. *Non-negative Matrix Factorization with Sparseness Constraints*. J. Mach. Learn. Res., 5:1457-1469, 2004, the entire disclosure of which is incorporated by reference herein.

Matrix A (a referenced above) is approximated with a product of two low-rank matrices that is estimated through the following minimization:

$$\min_{U \geq 0, V \geq 0} \|A - UV^T\|_F^2,$$

where U and V are n×K non-negative matrices. The rank or dimension of the approximation K corresponds to the number of latent factors; it is chosen to obtain a good data fit and interpretability, where U gives latent factors for origin stops and V gives latent factors for destination stops.

The factorized matrices are obtained by minimizing an objective function that consists of a goodness of fit term and a roughness penalty:

$$\min_{U \geq 0, V \geq 0} \|A - UV^T\|_F^2 + \lambda(\|U\|_1 + \|V\|_1), \quad \text{Equation (1)}$$

where the parameter $\lambda \geq 0$ indicates the penalty strength; a larger penalty encourages sparser matrices U and V. Adding penalties to NMF is a common strategy since NMF not only improves interpretability, but often improves numerical stability of the estimation.

FIG. 9 shows the results of sparse NNMF in equation (1) for the collapsed matrix $A^c$ for T=1 with 20 factors. It corresponds to the static view on user preferences, which are "fixed", i.e., accounted for by the smoothing operations described in greater detail below.

Smoothed Dynamic NNMF

Given a sequence of matrices $\{A_t\}_{t=1}^T$ for time periods $t=1, \ldots, T$, we want to produce a sequence of low-rank matrix factorizations $\{U_t, V_t\}_{t=1}^T$. We can extend the factorization in equation (1) to the temporal setting by independent factorization of T matrices $\{A_t\}$. However, the systems and methods set forth in the instant disclosure additionally impose a smoothness constraint on both $U_t$ and $V_t$, in order to force the latent factors to be similar to the previous time periods, in both boardings and alightings. The objective function then becomes:

$$\min_{U_t \geq 0, V_t \geq 0} \|A_t - U_t V_t^T\|_F^2 + \quad \text{Equation (2)}$$

$$\mu \sum_{t=2}^T (\|U_t - U_{t-1}\|_2^F + \|V_t - V_{t-1}\|_2^F) +$$

$$\lambda \left( \sum_{t=1}^T \|U_t\|_1 + \|V_t\|_1 \right),$$

where parameters $\lambda$, $\mu$ are set by the user. The objective function imposes smoothing $U_t$ and $V_t$ on two successive time periods, but it can be generalized to a larger window.

To estimate matrices $U_t$ and $V_t$, we use an extended version of the multiplicative updating algorithm for NNMF, based an adaptive gradient descent. Suitable examples of multiplicative updating algorithms for NNMF may be found in Gillis, Nicolas and Glineur, François. *Accelerated Multiplicative Updates and Hierarchical Als Algorithms for Nonnegative Matrix Factorization. Neural Comput.*, 24(4): 1085-1105, 2012; Lee, Daniel D and Seung, H Sebastian. *Algorithms for non-negative matrix factorization. Proc. NIPS'01*, pages 556-562, 2001; and Mankad, Shawn and Michailidis, George. *Structural and functional discovery in dynamic networks with non-negative matrix factorization. Phys. Rev. E,* 88:042812, 2013, the entire disclosures of which are incorporated by reference herein.

Temporal extensions of matrix factorization techniques have been studied in (Elsas, Jonathan L. and Dumais, Susan T. *Leveraging Temporal Dynamics of Document Content in Relevance Ranking. Proc. WSDM '10*, pages 1-10, New York, N.Y., USA, 2010. ACM; Mankad, Shawn and Michailidis, George. *Structural and functional discovery in dynamic networks with non-negative matrix factorization. Phys. Rev. E,* 88:042812, 2013; Ankan Saha and Vikas Sindhwani. *Learning evolving and emerging topics in social media: a dynamic NMF approach with temporal regularization. Proc. WSDM'12*, pages 693-702, 2012; and Sun, J. Z. and Parthasarathy, D. and Varshney, K. R. Collaborative Kalman Filtering for Dynamic Matrix Factorization. *IEEE Trans. on Signal Processing*, 62(14):3499-3509, 2014, the entire disclosures of which are incorporated by reference herein). In particular, Elsas et al., in *Leveraging Temporal Dynamics of Document Content in Relevance Ranking*, analysed the temporal dynamics of Web document content. To improve the relevance ranking, it developed a probabilistic document ranking algorithm that allows differential weighting of terms based on their temporal characteristics. Sun et al., in *Collaborative Kalman Filtering for Dynamic Matrix Factorization*, addressed recommendation systems with significant temporal dynamics; it developed the collaborative Kalman filter which extends probabilistic matrix factorization in time through a state-space model. Community detection in time-evolving graphs is analyzed in Mankad et al., *Structural and functional discovery in dynamic networks with non-negative matrix factorization*. The latent structure of overlapping communities is discovered through the sequential matrix factorization.

To solve Equation (2), one embodiment of the systems and methods set forth in the subject application employ Mankad et al., and consider the Lagrangian as follows $$L = \|A_t - U_t V_t^T\|_F^2 + \mu \sum_{t=2}^T (\|U_t - U_{t-1}\|_2^F + \|V_t - V_{t-1}\|_2^F) + \quad \text{Equation (3)}$$

$$\sum_{t=1}^T (\lambda(\|U_t\|_1 + \|V_t\|_1) + Tr(\Phi U_t) + Tr(\Psi V_t)),$$

where $\Phi, \Psi$ are Lagrange multipliers. The method works as an adaptive gradient descent converging to a local minimum. Kuhn-Tucker (KKT) optimality guarantees the necessary conditions for convergence. The KKT optimality conditions are obtained by setting $$\frac{\partial L}{\partial U_t} = 0; \frac{\partial L}{\partial V_t} = 0, t = 1, \ldots, T.$$

It can be shown that the KKT optimality conditions are obtained by $$\Phi = -2A_t V_t + 2U_t V_t^T V_t - 2\mu(U_{t-1} - U_t) + 2\lambda,$$

$$\Psi = -2A_t^T U_t + 2V_t U_t^T U_t - 2\mu(V_{t-1} - V_t) + 2\lambda, \quad \text{Equation (4)}$$

which after matrix algebra manipulations lead to the multiplicative updating rules presented in Algorithm 2:

---

Algorithm 2 Dynamic Smoothing NNMF algorithm.

Require: Matrices $A_t$, t = 1, . . . ,T, constants $\lambda$ ,$\mu$
1:      Initialize $U_t$, $V_t$ as dense, positive random matrices
2:      repeat
3:         for t = 1,. . . ,T do
4:            $U_t \leftarrow U_t(U_t V_t^T V_t + \lambda A U_t)^{-1}(A_t V_t + \mu U_{t-1})$
5:            $V_t \leftarrow V_t(V_t U_t^T U_t + \lambda A V_t)^{-1}(A_t^T U_t + \mu V_{t-1})$
6:         end for
7:      until Convergence
8:      return $U_t$, $V_t$, t = 1, . . . , T

---

It will be appreciated that the convergence of the multiplicative updating algorithm is often reported slow. However, in practice, meaningful factorizations are obtained after a handful of iterations, which may be explained by the sparseness of input matrices $A_t$. In the future, when working with the denser data and bigger cities, faster methods like active set version of the alternating nonnegative least squares (ANLS) algorithm will be more appropriate. Kim, Hyunsoo and Park, Haesun. Nonnegative Matrix Factorization Based on Alternating Nonnegativity Constrained Least Squares and Active Set Method. *SIAM J. Matrix Anal. Appl.*, 30(2):713-730, 2008, provides a suitable example of the aforementioned ANLS algorithm, the entire disclosure of which is hereby incorporated by reference.

Journey Featuring

Algorithm 2 finds sparse factorized matrices for a sequence of input matrices $A_t$, t=1, . . . , T. First, the algorithm is applied to sequences of service matrices $A_t^s$ and change matrices $A_t^c$, extracted from the full journey collection. Thus, smoothed factorized matrices $U_t^s$, $V_t^s$, and $U_t^c$, $V_t^c$, t=1, . . . , T for services and changes, are respectively obtained. At time period t, a boarding stop b has latent factors given by a corresponding row in $U_t^s$ this row is denoted $U_t^s(b)$. For an alighting stop a, row $V_t^s(a)$ gives the latent factors at time t. The algorithm may then be applied to the sum matrices, $A_t^f = A_t^c + A_t^s$, t=1, . . . , T. The smoothed factorized matrices for $A_t^f$ are denoted $U_t^f$, $V_t^f$.

To generate a feature vector x for a journey J, its decomposition into service legs and changes may be used, i.e., J=(S, C). The vector x(J) is then composed of a general feature vector $x_g$ and four latent components, $x(J)=\{x_g, x_b^s, x_a^s, x_b^c, x_a^c\}$, where:

$x_b^s$, $x_a^s$ are latent feature vectors averaged over the trip boarding and alighting places, respectively:

$$x_b^s = \frac{1}{n}\sum_{i=1}^{n} U_{t_i}^s(b_i); \quad x_a^s = \frac{1}{n}\sum_{i=1}^{n} V_{t_i}^s(a_i);$$

and $x_b^c$, $x_a^c$ are latent feature vectors averaged over the change places (alighting and boarding), respectively, $$x_b^c = \frac{1}{n-1}\sum_{i=1}^{n-1} U_{t_i}^c(b_i); \quad x_a^c = \frac{1}{n-1}\sum_{i=1}^{n} V_{t_i}^c(a_i).$$

In the case of sum latent matrices $U_t^f$, $V_t^f$, x(J) is composed of a general feature vector $x_g$ and two latent components, $x(J)=\{x_g, x_b^f, x_a^f\}$ obtained from $U_t^f$ and $V_t^f$.

Evaluation

In one experiment, 5.24 million passengers' journeys collected in the city of Nancy, France during a period of 3 months, in 2012, were processed. The Nancy public transport system offers 27 bus and tram schedule-based services running along 89 different routes, and accounting for a total of 1129 stops. In experiments, the working days data only was used, and all weekend and vacation data was excluded.

To evaluate the impact of learning user preferences from actual trips, the 240 most frequent origin-destination pairs were selected (see FIGS. 4A-4C). Some global statistics about the selected trips are reported in FIG. 10.

Two cases of generating temporal sequences of count matrices were considered. The main consideration was the case T=24, when any matrix includes counts during one hour. Another test consideration was the half-hour case with T=48. Once a matrix sequence is generated, any matrix is randomly split into 70% for training data and the remaining 30% for testing. All results below are means and variances over 10 independent runs.

During the experiment, the Web interface for retrieving the top journey/trip recommendations for the city of Nancy available at http://www.reseaustan.com was used. The ranking function was learned in accordance with to Algorithm 1 on the collected data, and thereafter used to re-rank the trip recommendations from the Web interface on the Nancy public transportation system, using various different options described in greater detail above. To understand the effect of raw count factorization, several options are considered. First, matrices are collapsed so as to disregard the temporal aspect. Second, either the service $A_t^s$ and change matrices $A_t^c$ are considered separately, or they are summed $A_t^f = A_t^s + A_t^c$ before the factorization. Third, the effect of temporal smoothing, when factorization is done either independent or by smoothing over successive time periods is studied. Finally, different values of K for the factorization are tested.

For evaluating the results of ranking methods, a measure commonly used in information retrieval, Normalized Discounted Cumulative Gain (NDCG), was used. Since it is expected to compare the ranking methods to multi-class classification, the perfect ranking's NDCG score 1 which is the error rate of the 1-top recommendation was chosen.

FIG. 11 reports the evaluation results for 12 different methods and compares them to the trip planner baseline for two values of T. Optimal values of $\mu$ and $\lambda$ have been determined by cross-validation. The analysis of these results provide some interesting insights. First, results are close for T=24 and T=48 cases. Second, collapsed matrices improve the baseline somewhat, but only taking into account temporal user preferences does really boost the performance. Third, the change latent variables appear to be more discriminative than services ones. Instead, using sum counts performs worse than keeping service and change variables separately. One can explain this by heterogeneity of service and change preferences.

Figure 12:
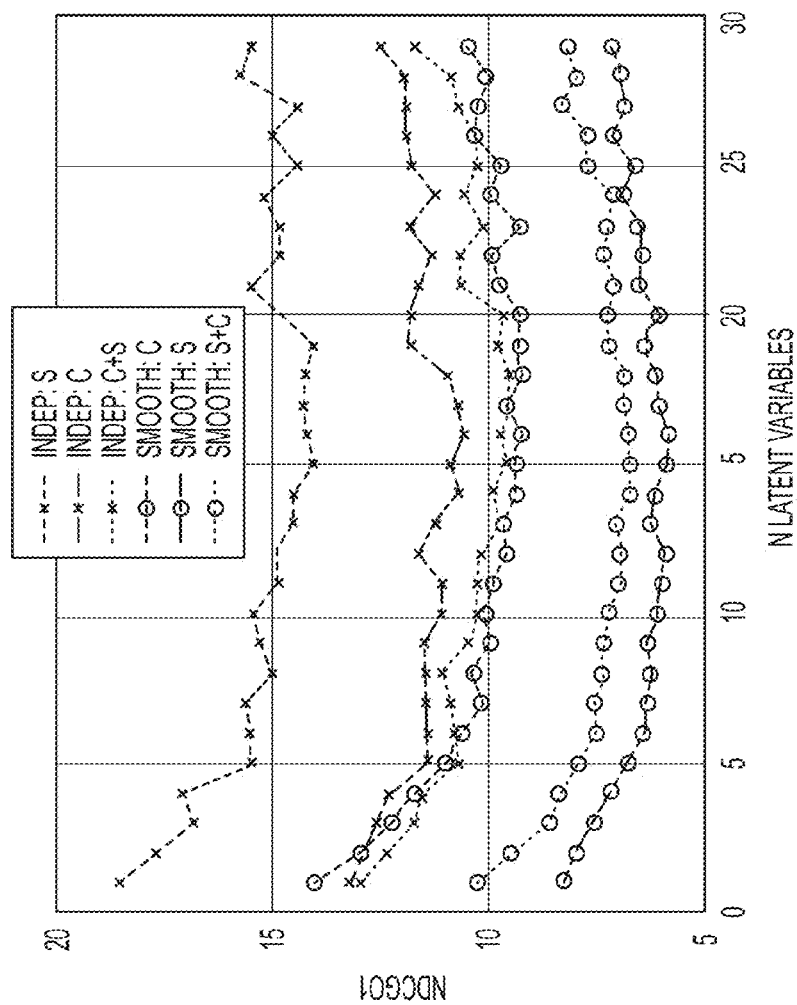
FIG. 12 depicts a graph representing the performance of independent and smoothed methods with latent variables from FIG. 11.

FIG. 12 illustrates independent and smoothed predictions vs the number of latent variables. That is, FIG. 12 shows the performance of 3 independent and 3 smoothed methods for T=24, with the number of latent variables K varying between 2 and 30. Surprisingly, already K=2 performs well enough, thus indicating the sparsity of the count matrices.

Figure 13:
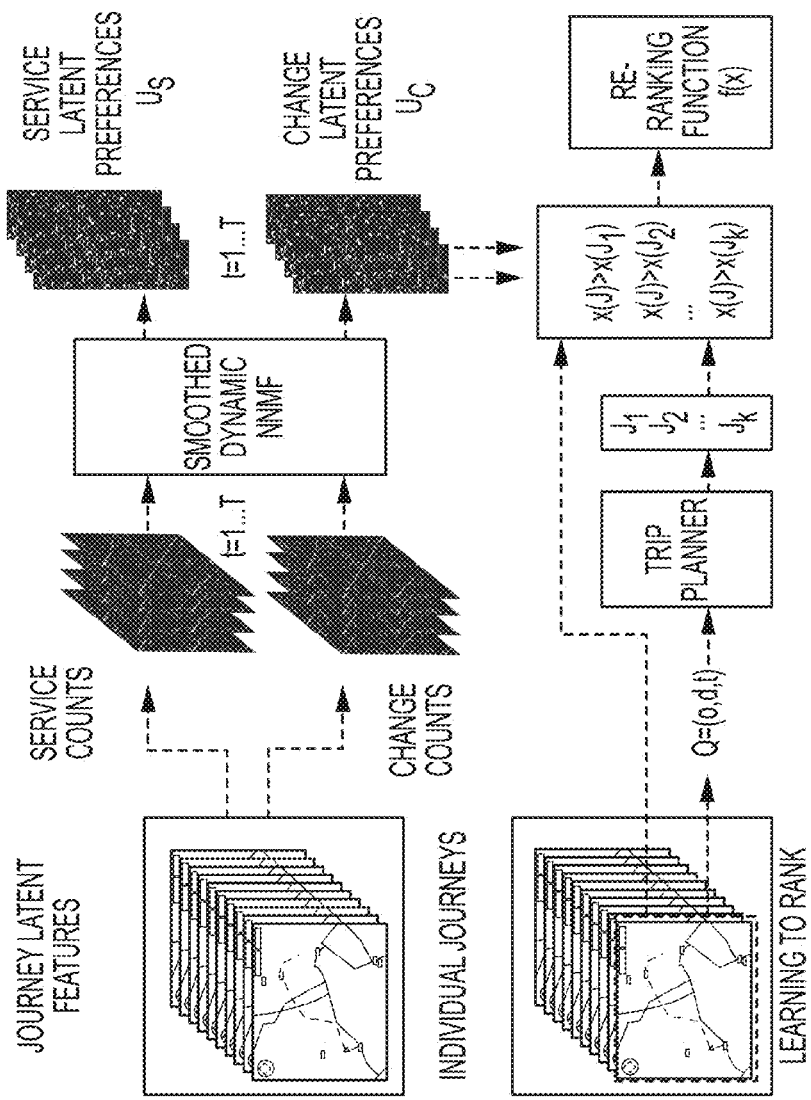
FIG. 13 depicts a functional block diagram of latent variable extraction in accordance with one aspect of the exemplary embodiment of the subject application.

FIG. 13 illustrates a functional block diagram of the process of latent feature extraction for individual trips 111 and learning the ranking function 190 in accordance with an exemplary embodiment of the subject application. As shown in FIG. 13, from the set of trips 111 matrices are extracted corresponding to the service and the change counts 196. The above-described smoothed dynamic non-negative matrix factorization is then applied to the extracted matrices. From the smoothed extracted matrices, dynamic latent variables 194 are inferred. The dynamic latent variables 194 are illustrated as service latent preferences and change latent preferences in FIG. 13. Thereafter, feature vectors for these dynamic latent variables 194 are generated. As illustrated in FIG. 13, the feature vectors and the pair-wise preferences 192 are used to learn the ranking function 190 for application to re-rank the results of a query to the journey/trip planner 158 to represent real-world rankings based upon traveler preferences.

The method illustrated in FIGS. 5 and 13 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 5 and 13 can be used to implement the method for crowdsourcing a transportation network.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for generating a list of trips on an associated transportation network, the list ranked in accordance with time-dependent modeling of passenger preferences, comprising:
    receiving a trip request from an associated user, the trip request including an origin, a destination and a departure time on the associated transportation network;
    retrieving, from an associated database, a set of actual trips corresponding to the received trip request, the set of actual trips each having a common origin, destination and departure time corresponding to the received trip request;
    acquiring sets of dynamic latent variables including at least one set expressing passenger preferences as to services on the associated transportation network and at least one set expressing passenger preferences as to changes points on the associated transportation network for the retrieved set of actual trips;
    converting each retrieved actual trip into a set of pair-wise preferences representing implicit selections of the corresponding passenger on each actual trip;
    extracting sequences of services matrices and change points matrices from the retrieved set of trips;
    generating a ranking function in accordance with the extracted sequences and sets of dynamic latent variables associated with the trip request;
    applying the ranking function to each trip in the set of retrieved trips corresponding to the received trip request to determine a ranking thereof; and
    ranking a list of trips corresponding to the received origin, destination and time received from an associated journey planner.

2. The computer-implemented method of claim 1, further comprising identifying a trip in accordance with the applied ranking function indicative of a preference of passengers on the network regardless, the identified trip not included in the list of trips received from the associated journey planner.

3. The computer-implemented method of claim 2, wherein prior to generating the ranking function, the computer-implemented method further comprising applying dynamic smoothing non-negative matrix factorization to the extracted sequences of matrices, wherein the ranking function is generated in accordance with the smoothed extracted sequences of matrices.

4. The computer-implemented method of claim 3, further comprising generating a feature vector for each trip in the retrieved set of actual trips, wherein each feature vector is defined as a function of a journey and a user query to which said journey is responsive.

5. The computer-implemented method of claim 4, wherein generating the feature vector x for a trip (J) in the set of actual trips, further comprises decomposing the trip (J) into service legs (S) and changes (C), J=(S, C), wherein the feature vector x(J) comprises a general feature vector $x_g$ and four latent components $\{x_b^s, x_a^s, x_b^c, x_b^c\}$, wherein the feature vector $x(J)=\{x_g, x_b^s, x_a^s, x_b^c, x_b^c\}$.

6. The computer-implemented method of claim 5, wherein the latent components $x_b^s$, $x_a^s$ are latent feature vectors averaged over trip boarding (b) and alighting (a) places, via respectively, $$x_b^s = \frac{1}{n}\sum_{i=1}^{n} U_{t_i^s}^s(b_i); \text{ and}$$

$$x_a^s = \frac{1}{n}\sum_{i=1}^{n} V_{t_i^a}^s(a_i).$$

7. The computer-implemented method of claim 6, wherein the latent components $x_b^c$, $x_a^c$ are latent feature vectors averaged over the change points (b) and alighting (a) points, via respectively, $$x_b^s = \frac{1}{n}\sum_{i=1}^{n} U_{t_i^s}^s(b_i); \text{ and}$$

$$x_a^s = \frac{1}{n}\sum_{i=1}^{n} V_{t_i^a}^s(a_i).$$

8. The computer-implemented method of claim 7, further comprising:
    receiving, from a plurality of automatic ticketing validation systems, validation information for each of a plurality of travelers of the transportation network, the validation information including a timestamp, at least one location, and a ticket identification;
    extracting, from the validation information, a trip for each of the plurality of travelers of the transportation network, the trip comprising an origin, a destination, and at least one of a departure time or a service; and
    storing the extracted trips in the associated database.

9. The computer-implemented method of claim 8, wherein the set of actual trips corresponding to the received trip request is generated from the extracted trips in the associated database.

10. A computer program product comprising a non-transitory recording medium storing instructions, which when executed on a computer causes the computer to perform the method of claim 1.

11. A system comprising memory storing instructions for performing the computer-implemented method for generating a list of trips on an associated transportation network of claim 1, and a processor operatively communicating with the memory which executes the instructions.

12. A system for generating a list of trips on an associated transportation network, the list ranked in accordance with time-dependent modeling of passenger preferences, the system comprising:
 a journey planner including a journey planning engine configured to receive a trip request from an associated user, the trip request including an origin, a destination and a departure time on the associated transportation network and return a list of trips on the associated transportation network responsive thereto;
 a re-ranking component configured to rank the list of trips in accordance with a ranking function;
 memory which stores instructions to:
  retrieve, from an associated database, a set of actual trips corresponding to the received trip request, the set of actual trips each having a common origin, destination and departure time corresponding to the received trip request,
  acquire sets of dynamic latent variables including at least one set expressing passenger preferences as to services on the associated transportation network and at least one set expressing passenger preferences as to changes points on the associated transportation network for the retrieved set of actual trips,
  convert each retrieved actual trip into a set of pair-wise preferences representing implicit selections of the corresponding passenger on each actual trip,
  extract sequences of services matrices and change points matrices from the retrieved set of trips,
  generate a ranking function in accordance with the extracted sequences and sets of dynamic latent variables associated with the trip request,
  apply the ranking function to each trip in the set of retrieved trips corresponding to the received trip request to determine a ranking thereof, and
  rank the list of trips corresponding to the received origin, destination and time received from an associated journey planner; and
 a processor operatively communicating with the memory which executes the instructions and implements the journey planner and the re-ranking component.

13. The system of claim 12, further comprising instructions for identifying a trip in accordance with the applied ranking function indicative of a preference of passengers on the network regardless, the identified trip not included in the list of trips received from the associated journey planner.

14. The system of claim 13, wherein prior to generating the ranking function, the instructions further comprising applying dynamic smoothing non-negative matrix factorization to the extracted sequences of matrices, wherein the ranking function is generated in accordance with the smoothed extracted sequences of matrices.

15. The system of claim 14, wherein generating the feature vector x for a trip (J) in the set of actual trips, further comprises decomposing the trip (J) into service legs (S) and changes (C), J=(S, C), wherein the feature vector x(J) comprises a general feature vector $x_g$ and four latent components $\{x_b^s, x_a^s, x_b^c, x_b^c\}$, wherein the feature vector x(J)=$\{x_g, x_b^s, x_a^s, x_b^c, x_b^c\}$.

16. The system of claim 15, wherein the latent components $x_b^s$, $x_a^s$ are latent feature vectors averaged over trip boarding (b) and alighting (a) places, via respectively, $$x_b^s = \frac{1}{n}\sum_{i=1}^{n} U_{t_i^s}^s(b_i); \text{ and}$$

$$x_a^s = \frac{1}{n}\sum_{i=1}^{n} V_{t_i^s}^s(a_i).$$

17. The system of claim 15, wherein the latent components $x_b^c$, $x_a^c$, are latent feature vectors averaged over the change points (b) and alighting (a) points, via respectively, $$x_b^s = \frac{1}{n}\sum_{i=1}^{n} U_{t_i^s}^s(b_i); \text{ and}$$

$$x_a^s = \frac{1}{n}\sum_{i=1}^{n} V_{t_i^s}^s(a_i).$$

18. The system of claim 15, further comprising a plurality of automatic ticketing validation systems to collect validation information for each of a plurality of travelers of the transportation network, the validation information including a timestamp, at least one location, and a ticket identification, further comprising instructions for:
 extracting, from the validation information, a trip for each of the plurality of travelers of the transportation network, the trip comprising an origin, a destination, and at least one of a departure time or a service; and
 storing the extracted trips in the associated database, wherein the set of actual trips corresponding to the received trip request is generated from the extracted trips in the associated database.

19. A computer-implemented method for generating a list of trips on an associated transportation network, the list ranked in accordance with time-dependent modeling of passenger preferences, comprising:
 extracting sequences of services matrices and change points matrices for a set of actual trips retrieved from an associated database responsive to a received trip request;
 applying dynamic smoothing non-negative matrix factorization to the extracted sequences of matrices;
 acquiring sets of dynamic latent variables including at least one set expressing passenger preferences as to services on the associated transportation network and at least one set expressing passenger preferences as to changes points on the associated transportation network from the retrieved set of trips;
 generating a feature vector for each trip in the retrieved set of actual trips from the extracted sequences of matrices, wherein each feature vector is defined as a function of a trip and a user query to which said trip is responsive;
 converting each retrieved actual trip into a set of pair-wise preferences representing implicit selections of the corresponding passenger on each actual trip; and
 learning a ranking function in accordance with the feature vectors generated from the smoothed extracted sequences of matrices associated with the trip request.

20. The computer-implemented method of claim 19, further comprising:
 receiving a list of trips from an associated journey planner responsive to the trip request;
 applying the ranking function to each trip in the list of trips corresponding to the received trip request to determine a ranking thereof; and re-ranking a list of trips responsive to application of the ranking function.

21. The computer-implemented method of claim 20, wherein generating the feature vector x for each trip (J) in the set of actual trips, further comprises decomposing the trip (J) into service legs (S) and changes (C), J=(S, C), wherein the feature vector x(J) comprises a general feature vector $x_g$ and four latent components $\{x_b^s, x_a^s, x_b^c, x_b^c\}$, wherein the feature vector $x(J)=\{x_g, x_b^s, x_a^s, x_b^c, x_b^c\}$.

22. The computer-implemented method of claim 21, wherein the latent components $x_b^s$, $x_a^s$, are latent feature vectors averaged over trip boarding (b) and alighting (a) places, via respectively, $$x_b^s = \frac{1}{n}\sum_{i=1}^{n} U_{t_i^b}^s(b_i); \text{ and}$$

$$x_a^s = \frac{1}{n}\sum_{i=1}^{n} V_{t_i^a}^s(a_i).$$

23. The computer-implemented method of claim 22, wherein the latent components $x_b^c$, $x_a^c$ are latent feature vectors averaged over the change points (b) and alighting (a) points, via respectively, $$x_b^s = \frac{1}{n}\sum_{i=1}^{n} U_{t_i^b}^s(b_i); \text{ and}$$

$$x_a^s = \frac{1}{n}\sum_{i=1}^{n} V_{t_i^a}^s(a_i).$$

\* \* \* \* \*